US008000220B2

(12) United States Patent
Hashimoto et al.

(10) Patent No.: US 8,000,220 B2
(45) Date of Patent: Aug. 16, 2011

(54) DIGITAL DATA TRANSMITTING APPARATUS AND DIGITAL DATA RECEIVING APPARATUS

(75) Inventors: Akinori Hashimoto, Tokyo (JP); Yoichi Suzuki, Tokyo (JP); Kazuyoshi Shogen, Tokyo (JP); Shoji Tanaka, Tokyo (JP); Hisashi Sujikai, Tokyo (JP)

(73) Assignee: Nippon Hoso Kyokai, Tokyo (JP)

( * ) Notice: Subject to any disclaimer, the term of this patent is extended or adjusted under 35 U.S.C. 154(b) by 0 days.

(21) Appl. No.: 12/528,037

(22) PCT Filed: Feb. 22, 2008

(86) PCT No.: PCT/JP2008/053077
§ 371 (c)(1),
(2), (4) Date: Mar. 5, 2010

(87) PCT Pub. No.: WO2008/102877
PCT Pub. Date: Aug. 28, 2008

(65) Prior Publication Data
US 2010/0166008 A1    Jul. 1, 2010

(30) Foreign Application Priority Data

Feb. 23, 2007 (JP) ................................. 2007-044305

(51) Int. Cl.
*H04J 11/00* (2006.01)
(52) U.S. Cl. ........................................ 370/203; 370/314
(58) Field of Classification Search .................. 370/203, 370/204, 208, 215, 314, 321, 337, 347, 349
See application file for complete search history.

(56) References Cited

U.S. PATENT DOCUMENTS

2005/0185738 A1* 8/2005 Gaikwad ....................... 375/340
(Continued)

FOREIGN PATENT DOCUMENTS

JP           6030066 A        2/1994
(Continued)

OTHER PUBLICATIONS

International Search Report, PCT/JP2008/053077, Mailed Apr. 15, 2008.

*Primary Examiner* — Brenda Pham
(74) *Attorney, Agent, or Firm* — Thomas J. Engellenner; Reza Moilaghababa; Nutter McClellen & Fish LLP

(57) ABSTRACT

To provide a digital data transmitting apparatus and a digital data receiving apparatus that can realize, even when a transmission channel characteristic changes because of aged deterioration or the like of a relay, improvement of a reception performance following the change.

A transmitting apparatus 1 generates a multiplexing frame formed by N slots including control information, data, outer parities, stuff bits, and inner parities and added with synchronization, pilot, and a transmission control signal and a parity and transmits data of the respective slots in a transmission system designated by the transmission control signal. In this case, pilot signals are symbols allocated to all signal points in order determined in advance for each of modulation schemes. A receiving apparatus 2 rewrites a phase error table 214 to calculate a phase error and performs synchronous detection according to the pilot signals. The receiving apparatus 2 also rewrites a likelihood table 235 to perform inner code decoding. Consequently, since reception processing adapted to distortion of a transmission channel characteristic can be performed, improvement of a reception performance can be realized.

10 Claims, 17 Drawing Sheets

U.S. PATENT DOCUMENTS

2005/0254596 A1* 11/2005 Naguib .................. 375/299
2007/0036248 A1   2/2007 Kumura

FOREIGN PATENT DOCUMENTS

| JP | 2001197138 A | 7/2001 |
| JP | 2003-179657 | 6/2003 |
| JP | 2004112655 A | 4/2004 |
| JP | 2004297144 A | 10/2004 |
| JP | 200633867 | 2/2006 |
| JP | 2006-254273 | 9/2006 |
| JP | 2006287561 A | 10/2006 |
| JP | 2007006014 A | 1/2007 |

* cited by examiner

DIGITAL DATA TRANSMITTING APPARATUS AND DIGITAL DATA RECEIVING APPARATUS

TECHNICAL FIELD

The present invention relates to a transmission technique for digital data, and, more particularly to a transmitting apparatus that forms a frame structure and performs data transmission and a receiving apparatus that recognizes the frame structure and performs reception of the data.

RELATED ART

First, a transmission system for a BS (Broadcasting satellite) digital broadcast is described. FIG. 1 is a diagram showing the structure of a multiplexing frame of the BS digital broadcast. In FIG. 1, in the multiplexing frame of the BS digital broadcast, a super frame of one channel is formed by eight frames #1 to #8. Each of the frames #1 to #8 is formed by forty-eight slots #1 to #48. "Slot" is an area on a memory that can store, as data, a portion excluding a synchronous byte (one byte) at the top of a packet (188 bytes) of an MPEG-2 TS (transport stream) and a parity (16 bytes) of an RS (Reed-Solomon) code. A frame synchronization signal, a TMCC (Transmission & Multiplexing Configuration Control) signal, a super frame synchronization signal, and the like are added to a lead byte of each of the slots.

Information and the like for performing control of transmission are written in the TMCC signal. One set of control content as a collection of multiplexed TMCC signals is written in one super frame. Transmission control for a super frame after the next on a time axis is performed according to this control content. As a kind of the transmission control, in the TMCC signal of the BS broadcast, transmission modes shown in Table 1 can be designated with respect to the respective slots. "Value" indicates a value of a bit for designating a transmission mode in the TMCC signal. "Transmission mode" means a combination of a modulation scheme and the coding rate of an inner code. Seven kinds of transmission performed by combining modulation schemes of BPSK, QPSK and TC8PSK and the inner code at coding rate r of 1/2 to 7/8 are possible.

TABLE 1

| Transmission mode | |
| --- | --- |
| Value | Transmission mode |
| 0000 | Reserve |
| 0001 | BPSK (r = 1/2) |
| 0010 | QPSK (r = 1/2) |
| 0011 | QPSK (r = 2/3) |
| 0100 | QPSK (r = 3/4) |
| 0101 | QPSK (r = 5/6) |
| 0110 | QPSK (r = 7/8) |
| 0111 | TC8PSK (r = 2/3) |
| 1000-1110 | Reserve |
| 1111 | No allocated system |

FIG. 2 is a diagram showing rules for allocation of the slots. As shown in Table 1, the transmission mode designated by the TMCC signal is configured such that frequency efficiency calculated as a product of frequency efficiency of a modulation scheme itself and the coding rate of an inner code is a simple integer ratio. Specifically, since frequency efficiencies of 8PSK, QPSK, and BPSK are 3[bps/Hz], 2[bps/Hz], and 1[bps/Hz], respectively, frequency efficiencies of BPSK (r=1/2), QPSK (r=1/2), QPSK (r=2/3), QPSK (r=3/4), QPSK (r=5/6), QPSK (r=7/8), and TC8PSK (r=2/3) are 1/2, 1, 4/3, 3/2, 5/3, 7/4, and 2, respectively. Since there are such integer ratios, when a transmission mode with lower frequency efficiency than that of TC8PSK is used, a clock rate of a multiplexing frame is fixed by arranging a dummy slot equivalent to the fall in efficiency to easily realize hardware.

FIG. 3 is a block diagram showing a configuration of a transmitting apparatus in the prior art. This transmitting apparatus 100 includes a frame generator 110, an energy disperser 120, an interleaver 130, a convolutional encoder 140, a mapper 150, an RS [64, 48] encoder 170, and an energy disperser 180. In transmitting a data stream, the transmitting apparatus 100 performs a series of processing from generation of a signal of the multiplexing frame forming the one super frame shown in FIG. 1 to generation of a modulated carrier signal.

The frame generator 110 generates, after applying encoding of RS[204,188] to data portions of the respective slots, a frame as an n-2th (second preceding) TMCC signal corresponding to an nth super frame by designating modulation schemes, coding rates of the inner code, and the like for the respective signals and generates a super frame. In an example shown in FIG. 3, TC8PSK modulation (the coding rate of the inner code, r=2/3) is designated for slots #1 to #46 and QPSK modulation (the coding rate of the inner code, r=1/2) is designated for a slot #47. When the TC8PSK modulation and the QPSK modulation are compared, in the QPSK modulation, the number of bits that can be transmitted when the same number of modulation symbols is used is only a half of that in the TC8PSK modulation. Therefore, as described with reference to FIG. 2, it is a rule to perform multiplex transmission of frames using a slot #48 as a dummy slot. In this way, the frame generator 110 inserts the dummy slot according to efficiency of a combination of a modulation scheme and the coding rate of the inner code in use.

The frame generator 110 outputs data portions of slots and parity portions of RS codes of slots in generated frames #1 to #8 to the energy disperser 120 and outputs synchronization and TMCC signals multiplexed on lead bytes of the respective slots to the RS encoder 170.

The energy disperser 120 is input with data portions of slots and parity portions of RS codes of slots in the frames #1 to #8 generated by the frame generator 110 and applies energy dispersion (bit randomizing) to all of these data and the like in the super frame. This is realized by generating a pseudo-random pattern of "1" and "0" using an Maximal-length sequences and MOD2-adding the pattern to the data in the slots. Consequently, since "1" or "0" does not continue, stabilization of synchronous recovery can be realized in a receiving apparatus described later.

The interleaver 130 is input with the data and the like subjected to the energy dispersion by the energy disperser 120 and performs interleave for each of the slots. This is pseudo-random replacement of an arranging order of bits and is realized by reading out, in a depth direction (a direction in which the frames are arranged), data written from the left to right in the respective slots. Consequently, even if continuous bit errors occur during transmission, since the receiving apparatus described later converts the bit errors into random bit errors by performing deinterleave for rearranging the original order, efficiency of an error correction code can be improved.

The convolutional encoder 140 applies, with a convolutional code (an inner code), encoding to the data and the like interleaved by the interleaver 130 at coding rates designated to the respective slots. The mapper 150 applies mapping by a designated modulation scheme to the data and the like convolutional-encoded by the convolutional encoder 140. A time division multiplexing/orthogonal modulating unit 160 applies time division multiplexing and orthogonal modulation to the data and the like and generates a modulated carrier signal.

On the other hand, the RS encoder 170 is input with the synchronization and TMCC signals multiplexed on the lead bytes of the slots in the frames #1 to #8 generated by the frame generator 110 and adds an error correction code parity to the TMCC signal portion using a Reed-Solomon code (RS[64, 48]). The energy disperser 180 applies energy dispersion to the TMCC signal added with the error correction code parity by the RS encoder 170. The convolutional encoder 140 encodes the TMCC signal using a convolutional code at a coding rate r=1/2. The mapper applies BPSK mapping to the TMCC signal. The time division multiplexing/orthogonal modulating unit 160 applies orthogonal modulation to the TMCC signal and generates a modulated carrier signal. The transmitting apparatus 100 transmits the modulated carrier signal generated in this way.

FIG. 4 is a diagram showing an example of the modulated carrier signal transmitted by the transmitting apparatus 100 shown in FIG. 3. As shown in FIG. 4, the control signal portion of the modulated carrier signal is transmitted with 192 symbols in total including frame synchronization W1 (32 symbols), the TMCC signal (or the error correction parity thereof/128 symbols), super frame synchronization (W2 in a lead frame and a reversed pattern W3 of W2/32 symbols) BPSK-modulated in frame units with respect to the respective frames. Thereafter, a main signal multiplexed with video/sound/data broadcast and the like by a digital modulation scheme designated by the TMCC signal is transmitted. When the main signal is transmitted, a burst signal for synchronization reinforcement (obtained by BPSK-modulating a random digital signal) is periodically multiplexed. By repeatedly performing such processing for 8 frames, information written in the TMCC signal is transmitted to the receiving apparatus. Since the receiving apparatus always monitors the information of the TMCC signal, even if various kinds of transmission control is performed in the transmitting apparatus 100, the receiving apparatus can switch a reception system and the like following the transmission control.

FIG. 5 is a block diagram showing a configuration of a receiving apparatus in the prior art. This receiving apparatus 200 includes a channel selector 210, an orthogonal detector 220, a transmission-control-signal decoder 230, an inner-code decoder 240, a deinterleaver 250, an energy dispersal remover 260, and an outer-code decoder 270. The receiving apparatus 200 receives the modulated carrier signal transmitted by the transmitting apparatus 100 shown in FIG. 1, switches a transmission system and the like on the basis of the information of the TMCC signal, and generates the original data stream.

The channel selector 210 is input with a broadcast wave, which is the demodulated carrier signal from the transmitting apparatus 100, as a BS-IF signal (first IF) via a BS antenna and a frequency convertor (not shown in the figure) incorporated in the BS antenna, selects a channel, and converts a signal of the channel into a second IF frequency and outputs the signal. In the frequency convertor, a broadcast wave in a 12 GHz band is converted into a BS-IF signal in a 1 GHz band.

In the civil standard ARIB STD-B21, this second IF frequency is set to "402.78 MHz, 479.5 MHz, or direct conversion".

The orthogonal detector 220 is input with the BS-IF (second IF) of the channel selected by the channel selector 210 and converts the BS-IF signal into a synchronization baseband signal. The transmission-control-signal decoder 230 is input with the synchronization baseband signal converted by the orthogonal detector 220 and, first, detects a synchronous byte of the TMCC signal and also detects, with reference to the synchronous byte, a position of a phase reference burst signal, which is a periodically multiplexed BPSK modulated carrier. Detection of information concerning a modulation scheme and error correction transmitted by the TMCC signal is also performed by the transmission-control-signal decoder 230. Information decoded by the transmission-control-signal decoder 230 is input to the inner-code decoder 240, the deinterleaver 250, the energy dispersal remover 260, and the outer-code decoder 270.

FIG. 6 is a diagram showing an internal configuration of the orthogonal detector 220 shown in FIG. 5. This orthogonal detector 220 includes a complex multiplier 221, root roll-off filters (RRFs) 222-1 and 222-2, a phase error table 223, a loop filter (LF) 224, and a numerical control oscillator (NCO) 225. In FIG. 6, it is assumed that the channel selector 210 adopts a direct conversion/sub-synchronous detecting system, which is the mainstream in recent years. There are two input signal lines (I signal and Q signal). Signal points detected in a state in which complete synchronous detection is not performed are output from the channel selector 210 to the signal lines. Received signal points are output in a low-speed rotated state. In order to stop this rotation and obtain stationary signal points, the complex multiplier 221 multiplies each complex signal, i.e. a signal of rotation in the opposite direction having the same magnitude as this rotating speed generated by the numerical control oscillator 225 and a signal input from the channel selector 210, and outputs signals. An I signal and a Q signal obtained in this way are stationary signal points. The root roll-off filters 222-1 and 222-2 subject the I signal and the Q signal to frequency limitation. Consequently, an orthogonal detection output is obtained and output to the inner-code decoder 240.

In order to perform frequency control in the numerical control oscillator 225, this orthogonal detection output is branched and input to the phase error table 223. This phase error table is a table for calculating a phase difference between a received signal point and an ideal signal point. The phase error table 223 is input with a modulation scheme/coding rate selection signal from the transmission-control-signal decoder 230 to determine a modulation scheme and a coding rate for the orthogonal detection output. The phase error table 223 performs phase comparison between an ideal value of a signal point corresponding to this modulation scheme and the coding rate and a signal point obtained from the orthogonal detection output and outputs a value proportional to a phase error amount of the signal points. The output of the phase error table 223 is smoothed by the loop filter 224 and input to a frequency control terminal of the numerical control oscillator 225. The numerical control oscillator 225 outputs a sine wave and a cosine wave of a frequency proportional to an input value of the frequency control terminal to the complex multiplier 221. According to these operations, the output of the complex multiplier 221 changes to the I signal and the Q signal of the stationary signal points.

The inner-code decoder 240 is input with a synchronous baseband signal, which is the orthogonal detection output from the orthogonal detector 220, and is input with information concerning the modulation scheme and the error correction detected by the transmission-control-signal decoder 230, performs TC8PSK decoding for a TC8PSK modulated portion and also performs, for a QPSK or BPSK modulated portion, decoding adjusted to the QPSK or BPSK modulated portion.

FIG. 7 is a diagram showing an internal configuration of the inner-code decoder 240 shown in FIG. 5. This inner-code decoder 240 includes a decoder 241 and a likelihood table 242. This likelihood table 242 is a table for calculating, from a received signal point, a probability (likelihood) that respective bits forming a symbol are 1 or 0. The I signal and the Q signal input from the orthogonal detector 220 are input to the decoder 241. The decoder 241 applies decoding of an inner code to the I signal and the Q signal. In applying the decoding to the I signal and the Q signal, the decoder 24 refers to the likelihood table designated by the modulation scheme/coding rate selection signal in the information concerning the modulation scheme and the error correction input from the transmission-control-signal decoder 230. First, the decoder 241 passes the I signal and the Q signal to the likelihood table 242. The likelihood table 242 outputs likelihood corresponding to the respective bits forming the symbol (in the case of 32APSK, 5 bits) to the decoder 241. The decoder 241 performs decoding of an inner code using this likelihood information.

The deinterleaver 250 restores, with respect to the signal subjected to the inner code decoding by the inner-code decoder 240, the order of arrangement bits replaced in the pseudo-random manner in the interleaver 130 to the original order. In order to restore data added with a pseudo-random code by the MOD2 in the energy disperser 120 of the transmitting apparatus 100 to the original data, the energy dispersal remover 260 applies removing of the energy dispersal to the signal deinterleaved by the deinterleaver 250 by adding the same pseudo-random code to the signal deinterleaved by the deinterleaver 250 again with the MOD2. The outer-code decoder 270 applies Reed-Solomon decoding to the signal subjected to energy dispersal removal by the energy dispersal remover 260.

In this way, in the present BS digital broadcast, a multiplexed frames including forty-eight slots is formed and a modulation scheme and a coding rate of an error correction code are designated for a TS packet of MPEG-2 multiplexed on the slots by using the TMCC signal. This allows for flexible time-division multiplex transmission for plural modulation schemes.

As examples of the transmitting apparatus and the receiving apparatus used for such a transmission system, those described in Patent Documents 1 and 2 are known.

Patent Document 1: Japanese Patent Application Laid-Open No. 2003-179657
Patent Document 2: Japanese Patent Application Laid-Open No. 2006-254273

DISCLOSURE OF THE INVENTION

Problems to be Solved by the Invention

In this way, since the frame for further multiplexing the TS packet of MPEG-2 is formed and the TMCC signal is used, in the BS digital broadcast currently under operation, it is possible to perform flexible transmission control and flexible time-division multiplex transmission for plural modulation schemes. The receiving apparatus that receives such a multiplexing frame detects a phase error using a phase error table set in advance, performs synchronous detection, detects likelihood using the likelihood table set in advance, and performs inner-code decoding.

However, according to aged deterioration of a satellite relay and a change in a back-off amount, when a transmission channel characteristic changes, an optimum phase error cannot be detected.

Therefore, there is a problem in that stable synchronous detection cannot be performed. When the transmission channel characteristic changes, there is also a problem in that stable code decoding cannot be performed and required C/N cannot be effectively reduced. In this case, it is desirable to improve a reception performance to make it possible to cope with the change in the transmission channel characteristic.

Therefore, the present invention has been devised in order to solve the problems and it is an object of the present invention to provide a digital data transmitting apparatus and a digital data receiving apparatus that can realize, even when a transmission channel characteristic changes because of aged deterioration or the like of a relay, improvement of a reception performance following the change.

Means for Solving the Problem

In order to solve the problems, a transmitting apparatus according to the present invention is a transmitting apparatus used for a system that transmits data according to a digital modulation scheme for shifting amplitude and phase, the transmitting apparatus comprising: means for mapping, for each number of bits per symbol corresponding to respective signal points of the modulation scheme, transmission data to the signal points; means for applying, in predefined order, signal point mapping to all symbols allocated to the respective signal points of the modulation scheme; means for periodically time-division multiplexing a signal point signal generated by mapping the symbols in the predefined order on a signal point signal generated by mapping the transmission data to generate a time division multiplex signal; and means for applying orthogonal modulation to the generated time division multiplex signal and transmitting orthogonal modulated carrier signal, wherein the transmitting apparatus periodically time-division multiplexes the signal in predefined order, orthogonally modulates the signal, and transmits the signal with symbols allocated to the respective signal points of the digital modulation scheme set as pilot signals.

A transmitting apparatus according to the present invention is a transmitting apparatus used for a system that transmits data according to a digital modulation scheme for shifting amplitude and phase, the transmitting apparatus comprising: means for mapping, for each number of bits per symbol corresponding to respective signal points of the modulation scheme, transmission data to the signal points; means for applying, in predefined order, signal point mapping to at least one of signal points on respective concentric circles of symbols allocated to the respective signal points of the modulation scheme; means for periodically time-division multiplexing a signal point signal generated by mapping the symbols in the predefined order on a signal point signal generated by mapping the transmission data to generate a time division multiplex signal; and means for applying orthogonal modulation to the generated time division multiplex signal and transmitting orthogonal modulated carrier signal, wherein the transmitting apparatus periodically time-division multiplexes the signal in predefined order, orthogonally modulates the signal, and transmits the signal with symbols allocated to the respective signal points of the digital modulation scheme set as pilot signals.

A receiving apparatus according to the present invention is a receiving apparatus used for a system that transmits data according to a digital modulation scheme for shifting amplitude and phase, the receiving apparatus comprising: means for applying orthogonal detection to a reception signal; and pilot-signal extracting means for extracting, concerning symbols of pilot signals periodically time-division multiplexed on the reception signal in predefined order, signal points modulated by the symbols, wherein the receiving apparatus orthogonally detects, with the orthogonal detecting means, a signal obtained by periodically time-division multiplexing transmission data and symbols of predefined pilot signals different from the transmission data, detects, with the pilot-signal extracting means, signal point position information corresponding to the symbols of the predefined pilot signals, and performs reception of the transmission data on the basis of the signal point position information.

A receiving apparatus according to the present invention is a receiving apparatus used for a system that transmits data according to a digital modulation scheme for shifting amplitude and phase, the receiving apparatus comprising: means for applying orthogonal detection to a reception signal; pilot-signal extracting means for extracting, concerning symbols of pilot signals in which at least one of signal points on respective concentric circles of symbols allocated to respective signal points of the modulation scheme is periodically time-division multiplexed on the reception signal in predefined order, signal points modulated by the symbols; and signal-point-position estimating means for estimating, from symbols transmitted as the pilot signals, signal points of symbols not transmitted as the pilot signals, wherein the receiving apparatus orthogonally detects, with the orthogonal detecting means, a signal obtained by periodically time-division multiplexing transmission data and symbols of predefined pilot signals different from the transmission data, detects, with the pilot-signal extracting means, signal point position information corresponding to the symbols of the predefined pilot signals, acquires, with the signal-point-position estimating means, signal point position information of the symbols not transmitted as the pilot signal from the signal point position information, and performs reception of the transmission data on the basis of the signal point position information.

The transmitting apparatus according to the present invention is characterized in that the digital modulation scheme for shifting amplitude and phase is 16APSK, 16QAM, 32APSK, or 32QAM.

The receiving apparatus according to the present invention is characterized in that the digital modulation scheme for shifting amplitude and phase is 16APSK, 16QAM, 32APSK, or 32QAM.

The transmitting apparatus according to the present invention characterized by further including LDPC encoding means for encoding by an LDPC code to the transmission data.

The receiving apparatus according to the present invention is characterized by comprising: pilot-signal averaging means for averaging the signal point positions of the pilot signals for each of the symbols; and phase-error-table generating means for generating, on the basis of a result of the averaging of the pilot signals, a phase error table for detecting a phase error in a signal point position corresponding to a modulation scheme and a coding rate.

The receiving apparatus according to the present invention is characterized by comprising: pilot-signal averaging means for averaging the signal point positions of the pilot signals for each of the symbols; and likelihood-table generating means for generating, on the basis of a result of the averaging of the pilot signals, a likelihood table for performing inner code decoding processing in a signal point position corresponding to a modulation scheme and a coding rate.

The receiving apparatus according to the present invention is characterized by further comprising LDPC decoding means for LDPC decoding using the likelihood table generated by the likelihood-table generating means.

The transmitting apparatus according to the present invention is characterized in that the system is a data transmission system for time-division multiplexing and for transmitting with plural kinds of digital modulation schemes.

The receiving apparatus according to the present invention is characterized in that the system for time-division multiplexing and for transmitting with plural kinds of digital modulation schemes.

The transmitting apparatus according to the present invention is characterized in that one or more of 32APSK, 16APSK, 32QAM, and 16QAM is included as the digital modulation scheme.

The receiving apparatus according to the present invention is characterized in that one or more of 32APSK, 16APSK, 32QAM, and 16QAM is included as the digital modulation scheme.

Effect of the Invention

As described above, according to the present invention, it is possible to realize a digital data transmitting apparatus and a digital data receiving apparatus that can realize, even when a transmission channel characteristic changes because of aged deterioration or the like of a relay, improvement of a reception performance following the change.

BEST MODE FOR CARRYING OUT THE INVENTION

A best mode for carrying out the present invention is described in detail below with reference to the drawings.
[Transmitting Apparatus]

Figure 8:
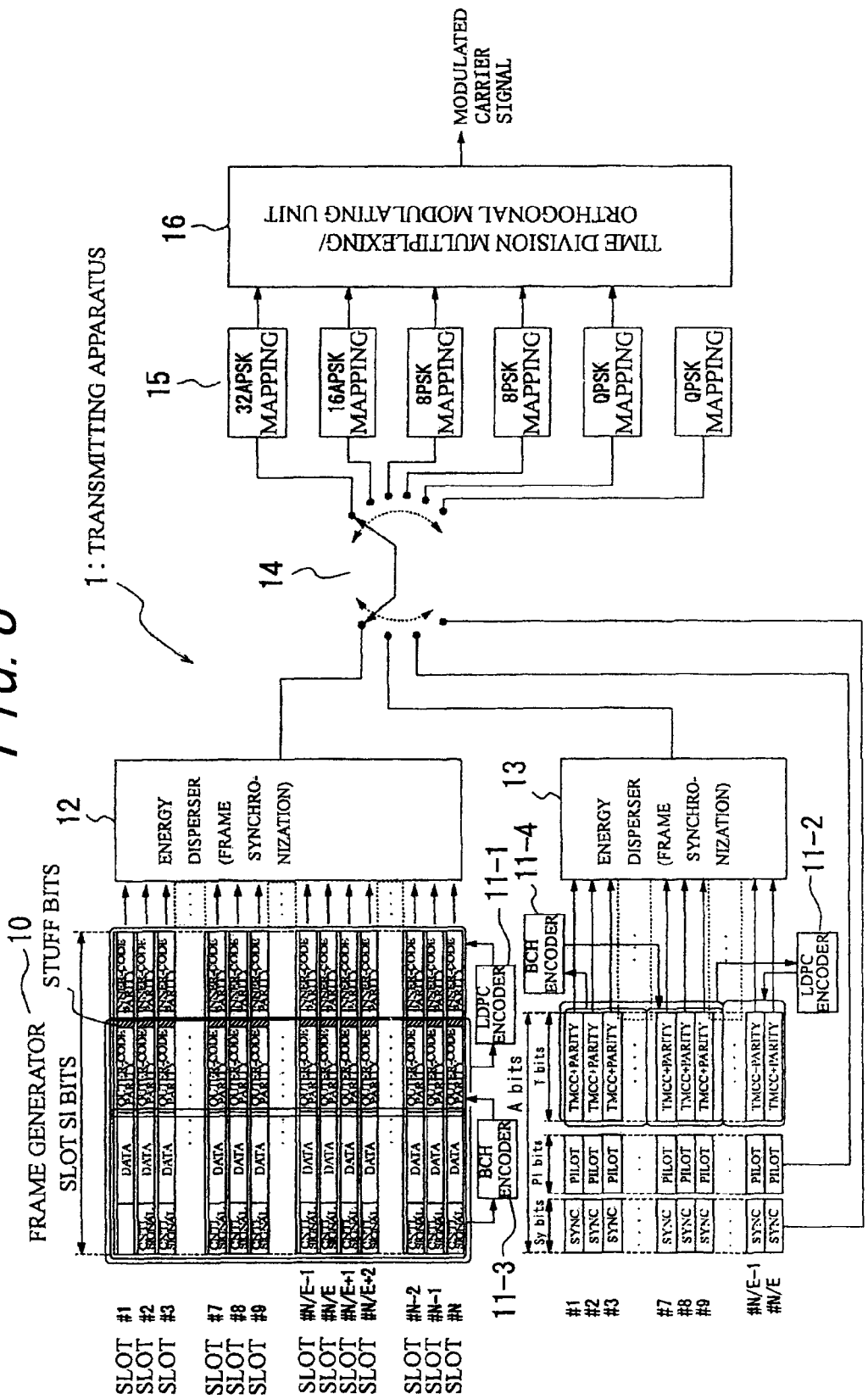
FIG. 8 is a diagram showing a configuration of a transmitting apparatus according to an embodiment of the present invention.

First, a transmitting apparatus according to an embodiment of the present invention is described. FIG. 8 is diagram showing a configuration of the transmitting apparatus according to the embodiment of the present invention. This transmitting apparatus 1 transmits, as pilot signals, symbols allocated to all signal points in order determined in advance for each of modulation schemes. Consequently, a receiving apparatus can learn the signal points corresponding to the respective symbols and realize improvement of a reception performance according to the signal points. However, as in a signal point arrangement shown in FIG. 12, when a signal point arrangement has plural signal points on concentric circles, the signal points on the concentric circles are equally affected in amplitude and phase by a nonlinear characteristic of a transmission channel. Therefore, one or more of the symbols corresponding to the signal points on the respective concentric circles may be transmitted as pilot signals. In that case, a receiver side only has to estimate, from signal point positions of the symbols on the concentric circles transmitted as the pilot signals, signal points of the symbols not transmitted as the pilot signals. In other words, the signal points can be estimated from a condition that relative angles from the signal point positions of the symbols on the concentric circles transmitted as the pilot signals are equal to those of the signal point positions used for the transmission.

This transmitting apparatus 1 includes a frame generator 10, LDPC (Low Density Parity Check) encoders 11-1 and 11-2, BCH encoders 11-3 and 11-4, energy dispersers 12 and 13, a switch 14, a mapper 15, and a time division multiplexing/orthogonal modulating unit 16. In transmitting a data stream, the transmitting apparatus 1 performs a series of processing from generation of a signal of a multiplexing frame shown in FIG. 8 described later to generation of a modulated carrier signal.

Figure 3:
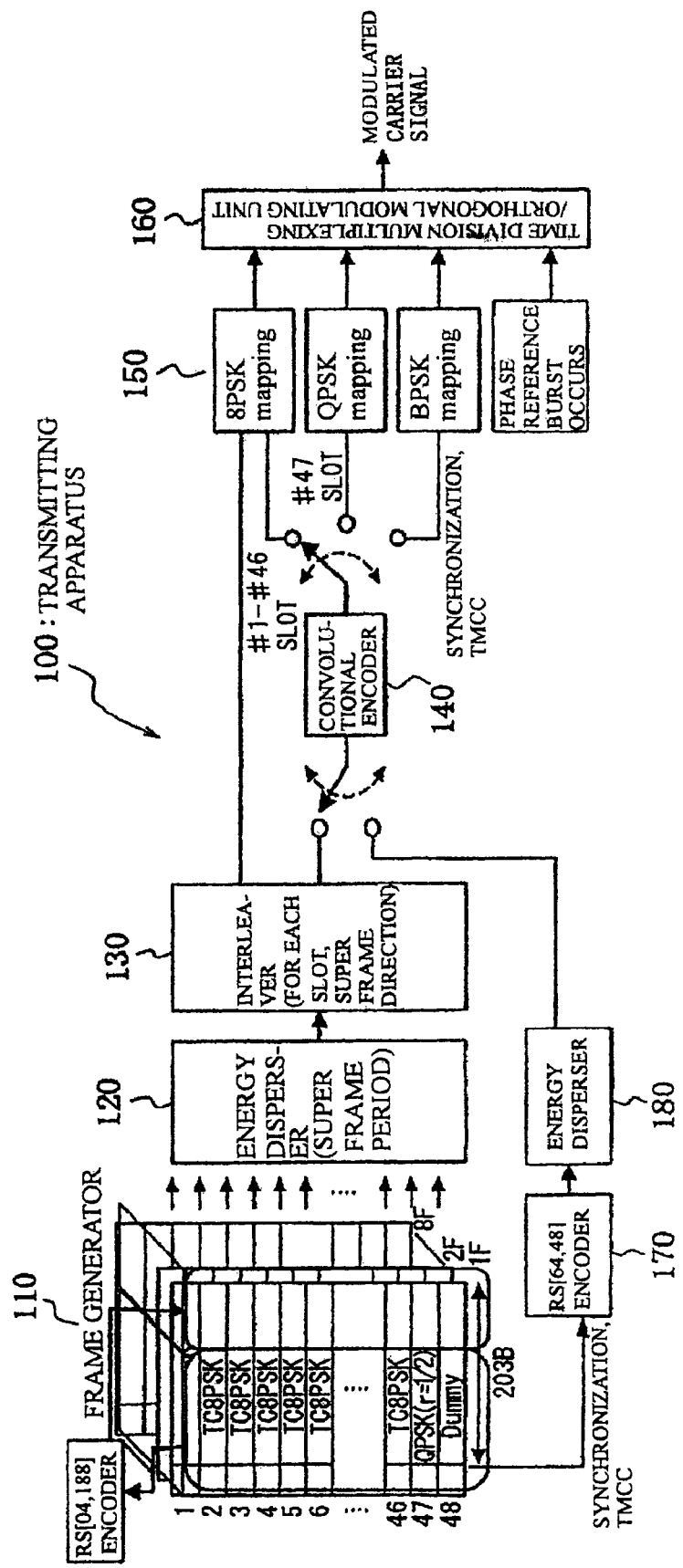
FIG. 3 is a diagram showing a configuration of a transmitting apparatus according to a prior art.
Figure 4:
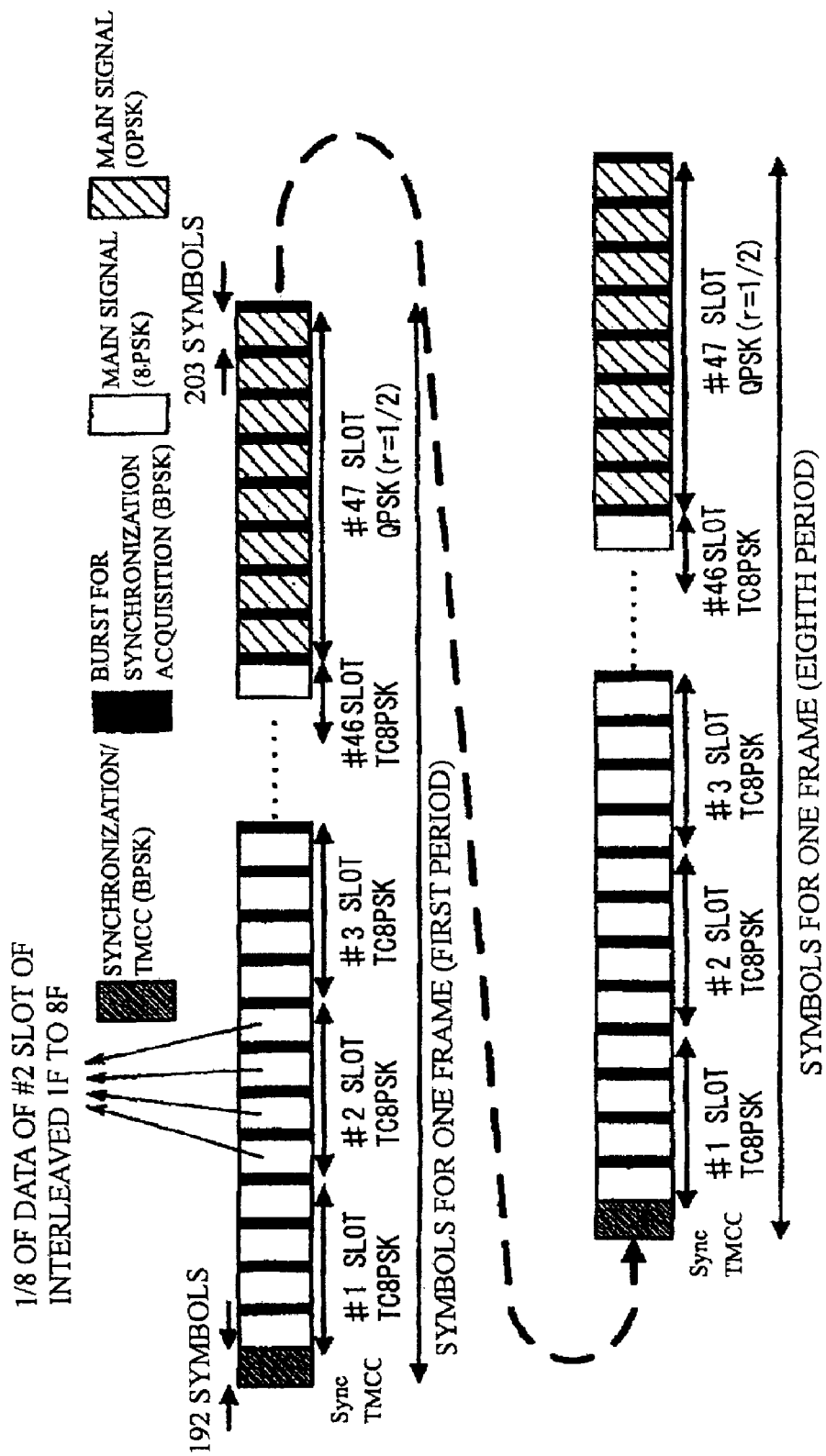
FIG. 4 is a diagram showing an example of a modulated carrier signal.

When the transmitting apparatus 100 in the prior art shown in FIG. 3 and this transmitting apparatus 1 are compared, both the apparatuses are the same in that the apparatuses include the energy dispersers, the mappers, and the time division multiplexing/orthogonal modulating units. However, the apparatuses are different in that the transmitting apparatus 1 includes the frame generator 10 different from the frame generator 110 of the transmitting apparatus 100 in the prior art, a convolutional code is replaced with an LDPC code as an inner code, an RS code is replaced with a BCH code as an outer code, the mapper 15 is also applicable to 16APSK and 32APSK, a super frame is not formed, and the transmitting apparatus 1 does not include an interleaver.

The mapper 15 is also applicable to 16APSK and 32APSK because the corresponding modulation schemes are simply increased. The convolutional code is replaced with the LDPC code as the inner code and the RS code is replaced with the BCH code as the outer code such that the transmitting apparatus 1 can be adapted to the recent technical trend. The super frame is not formed and interleave is not performed because the LDPC code already has a characteristic equivalent to application of sufficiently long interleave. Therefore, an essential difference is only that the frame generator 10 generates a frame having the structure shown in FIG. 8 described later. The operation for generating the frame is the same as that of the transmitting apparatus 100 in the prior art shown in FIG. 3.

Specifically, the frame generator 10 generates, concerning slit Sl bits, a frame including slots #1 to #N formed by control information, data, outer code parities obtained by encoding the control information and the data with the BCH encoder 11-3, stuff bits, and inner code parities obtained by LDPC-encoding the control information, the data, the outer code parities, and the stuff bits with the LDPC encoder 11-1 and outputs the frame to the energy disperser 12. The frame generator 10 generates, concerning a TMCC signal, a BCH parity with the BCH encoder 11-4 and generates an LDPC parity with the LDPC encoder 11-2. A multiplexing frame generated by the frame generator 10 is generated such that the number of slots N, E for specifying an amount of dummies, slot length Sl, synchronous bit length Sy, pilot bit length Pl, and TMCC and parity bit length T are the numbers described above.

Figure 9:
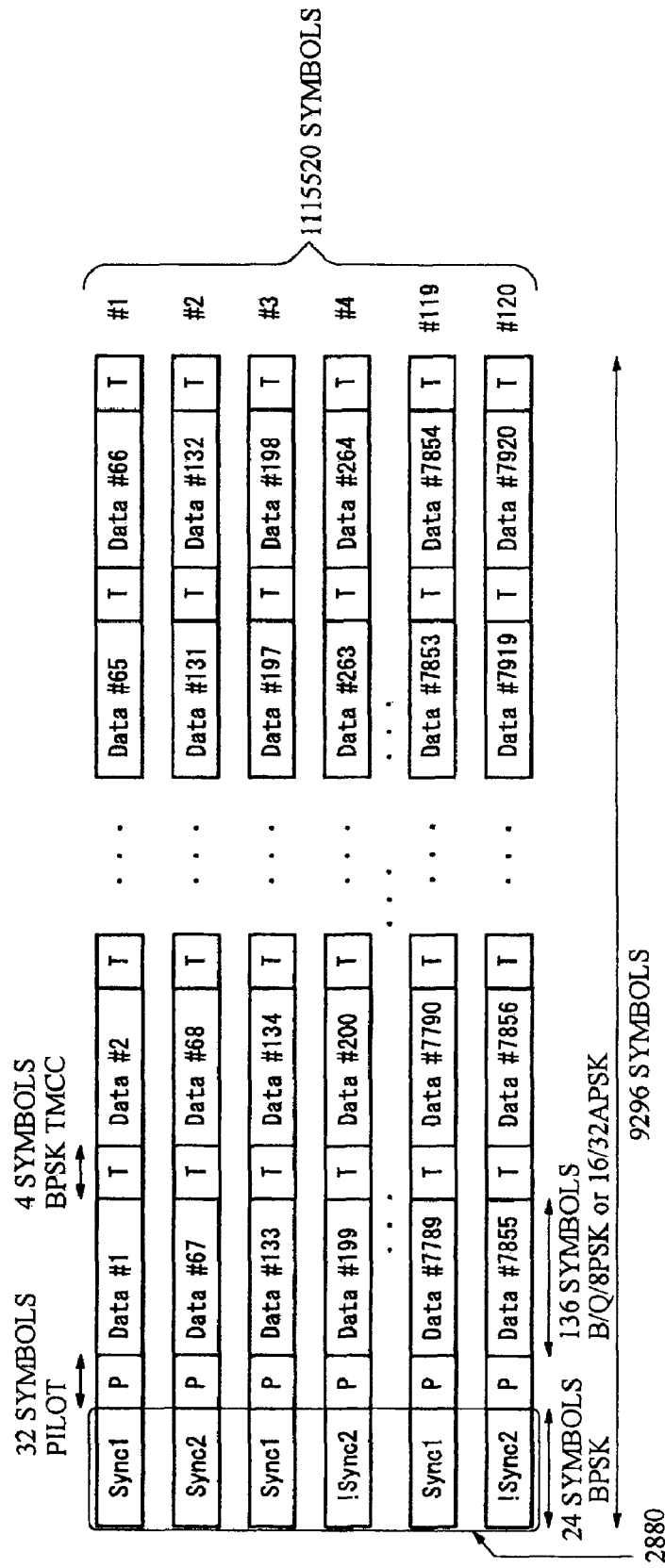
FIG. 9 is a diagram showing an example of a modulated carrier signal transmitted by the transmitting apparatus according to the embodiment of the present invention.

FIG. 9 is a diagram showing an example of a modulated carrier signal transmitted by the transmitting apparatus 1 shown in FIG. 8. This modulated carrier signal is a signal in the case of a maximum-efficiency modulation scheme set as 32APSK (or 32QAM), N=120, E=5, Sl=44880, Sy=120, Pl=160, and T=1320 in the frame shown in FIG. 8 described later. The time division multiplexing/orthogonal modulating unit 16 shown in FIG. 8 generates the modulated carrier signal.

As shown in FIG. 9, the modulated carrier signal is transmitted with information for one frame divided into modulated slots #1 to #120. In the modulated slots of odd numbers, first, BPSK-modulated slot synchronization Sync1 (24 symbols) and pilot signals (32 symbols) corresponding to a modulation scheme for the modulated slots are transmitted. Subsequently, main signal data (136 symbols) modulated in a modulation scheme designated by a TMCC signal and multiplexed with video, sound, data broadcast, and the like and a BPSK-modulated TMCC signal (4 symbols) are alternately transmitted sixty-six times. In the modulated slots of even numbers, first, BPSK-modulated slot synchronization Sync2 (24 symbols) or a reversed pattern ! Sync2 (24 symbols) thereof and pilot signals (32 symbols) corresponding to the modulation scheme for the modulated slots are transmitted. Subsequently, main signal data (136 symbols) modulated in a modulation scheme designated by a TMCC signal and multiplexed with video, sound, data broadcast, and the like and a BPSK-modulated TMCC signal (4 symbols) are alternately transmitted sixty-six times.

In order to prevent pseudo synchronization, the synchronous patterns Sync1 and Sync2 and the reversed pattern ! Sync2 thereof need to have auto-correlation peaks and have low correlation with each other. As such codes, when Sync1 is set as 0x36715a=001101100111000101011010, Sync2 is set as 0x52f866=010100101111100001100110, and the bit reversed pattern !Sync2 thereof is set as 0xad0799=101011010000011110011001, reception with less pseudo synchronization is possible. However, when a signal point arrangement has plural signal points on concentric circles as in a signal point arrangement shown in FIG. 12, as described above, one or more symbols corresponding to the signal points on the respective concentric circles may be transmitted as pilot signals as described above.

Concerning the pilot signals, for example, it is conceivable to transmit, as pilot signals of modulated slots multiplexed with 32APSK modulation, symbols "00000", "00001", ..., "11110", and "11111" formed by 5 bits allocated to respective signal points of 32APSK modulation. By transmitting symbols allocated to all the signal points are transmitted in order determined in advance, it is possible to inform the reception side of signal points corresponding to the respective symbols. In particular, in the case of a signal that passes through a transmission channel having a nonlinear characteristic such as a satellite relay, the signal points corresponding to the respective symbols in a state affected by distortion of the transmission channel are received. Therefore, it is possible to realize improvement of a reception performance according to a method described later.

By performing such processing repeatedly for 120 modulated slots, the symbols allocated to all the signal points for each of the modulation schemes are transmitted to a receiving apparatus described later and the information written in the TMCC signal is transmitted to the receiving apparatus. The receiving apparatus can improve a reception performance by using the signal points. By always monitoring the information of the TMCC signal, even if various kinds of transmission control is performed in the transmitting apparatus 1, a reception system and the like can be switched following the transmission control.

[Receiving Apparatus]

Figure 10:
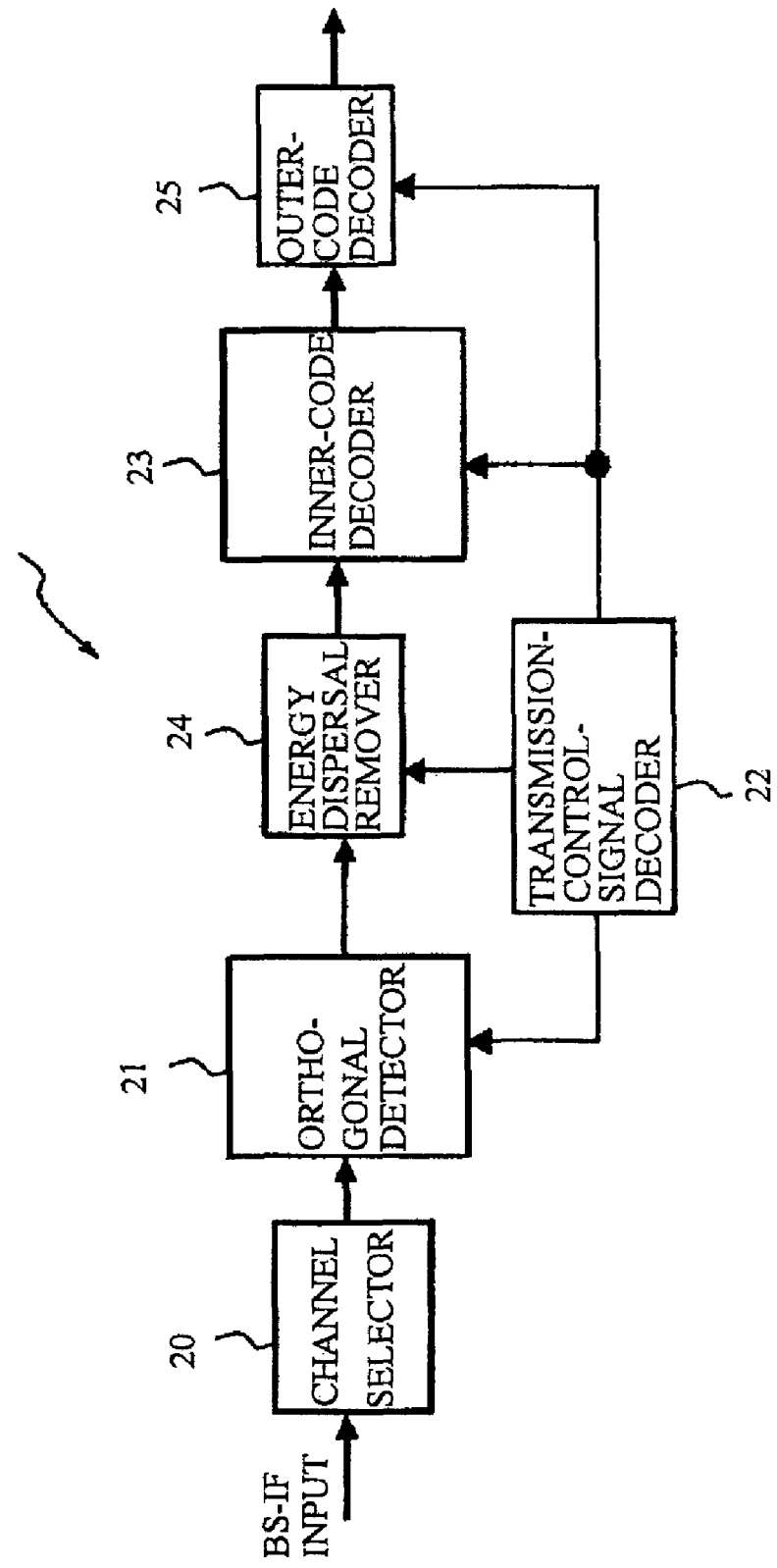
FIG. 10 is a diagram showing a configuration of a receiving apparatus according to the embodiment of the present invention.

Next, a receiving apparatus according to the embodiment of the present invention is described. FIG. 10 is a diagram showing a configuration of the receiving apparatus according to the embodiment of the present invention. This receiving apparatus 2 includes a channel selector 20, an orthogonal detector 21, a transmission-control-signal decoder 22, an inner-code decoder 23, an energy dispersal remover 24, and an outer-code decoder 25. The channel selector 20, the orthogonal detector 21, the transmission-control-signal decoder 22, the inner-code decoder 23, the energy dispersal remover 24, and the outer-code decoder 25 have functions equivalent to those of the channel selector 210, the orthogonal detector 220, the transmission-control-signal decoder 230, the inner-code decoder 240, the energy dispersal remover 260, and the outer-code decoder 270 shown in FIG. 5, respectively.

Figure 5:
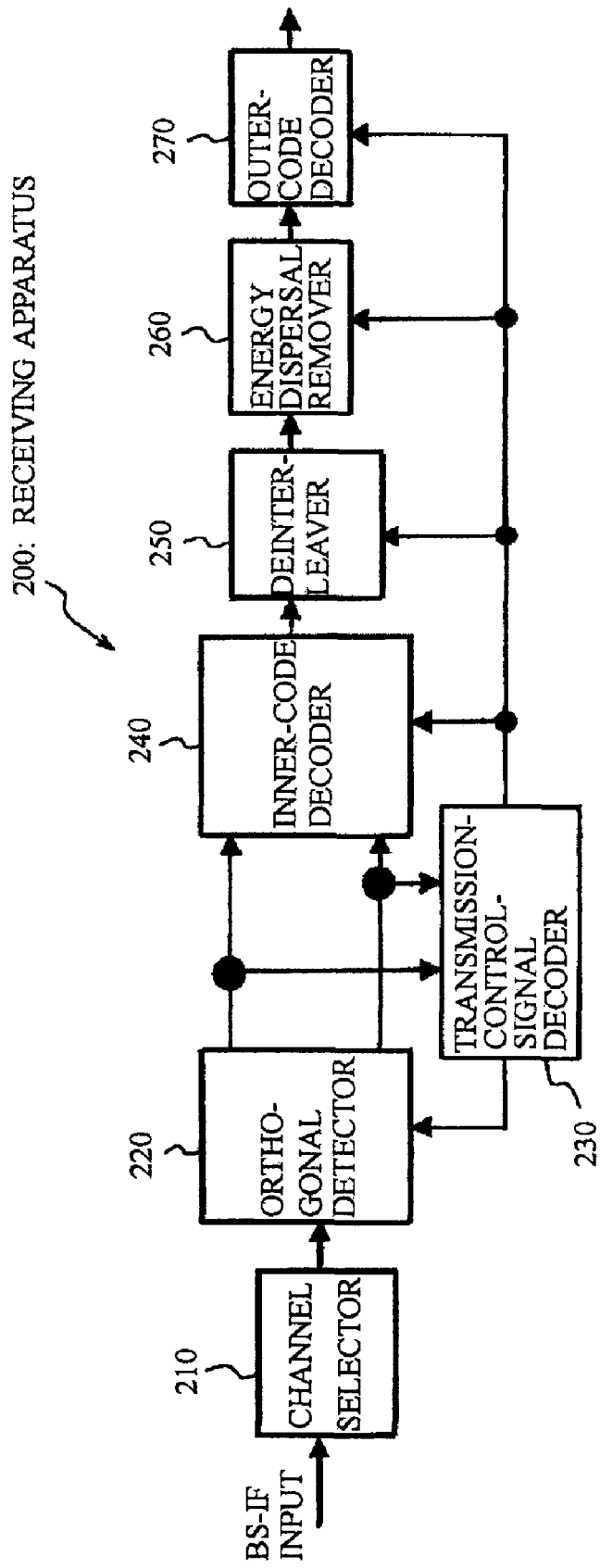
FIG. 5 is a diagram showing a configuration of a receiving apparatus according to the prior art.

When the configuration of the receiving apparatus 200 in the prior art shown in FIG. 5 and this receiving apparatus 2 are compared, the receiving apparatuses are different in that, in the receiving apparatus 2, the deinterleaver 250 is not provided, 16APSK and 32APSK are added to the modulation schemes detected by the orthogonal detector 21, correction of reception signal points is performed with reference to pilot signals to improve a performance when detection is performed in the orthogonal detector 21, an inner code in the inner-code decoder 23 corresponds to an LDPC code, an outer code in the outer-code decoder 270 corresponds to a BCH code, and control corresponding to the frame structure shown in FIG. 8 is performed by the transmission-control-signal decoder 22.

16APSK and 32APSK are added to the modulation schemes detected by the orthogonal detector 21 because modulation schemes corresponding to the orthogonal detector 21 are simply increased in the orthogonal detector 21. The inner code in the inner-code decoder 23 corresponding to the LDPC code and the outer code in the outer-code decoder 270 corresponds to the BCH code such that the receiving apparatus 2 can be adapted to the recent technical trend. Deinterleave is not performed because the LDPC code already has a characteristic equivalent to application of sufficiently long interleave. Therefore, an essential difference is only that the transmission-control-signal decoder 22 performs control corresponding to the frame structure shown in FIG. 8 and performs reception referring to pilot signals. Other operations are the same as those of the receiving apparatus 200 in the prior art shown in FIG. 5.

Figure 11:
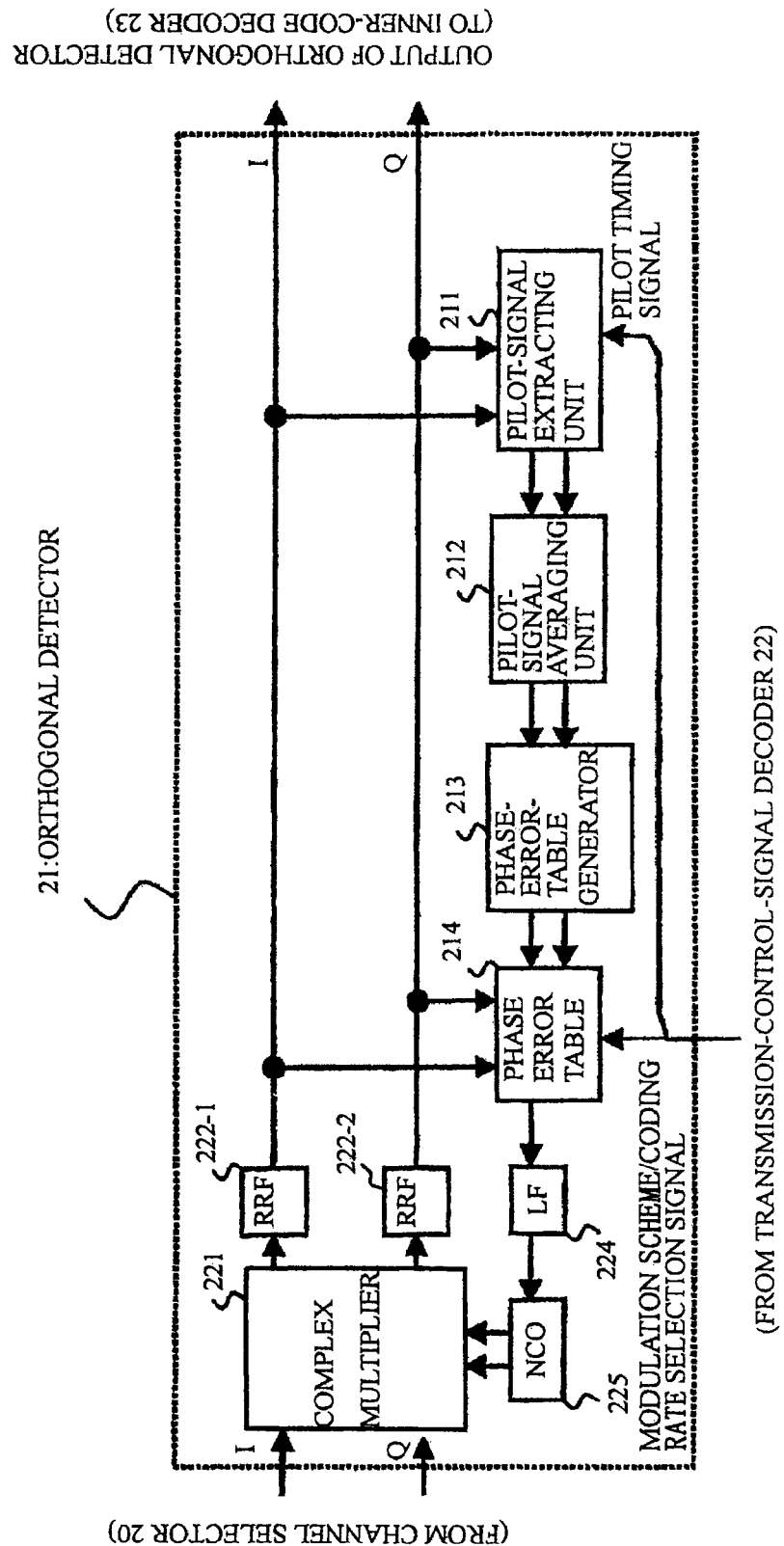
FIG. 11 is a diagram showing a configuration of an orthogonal detector of the receiving apparatus according to the embodiment of the present invention.

FIG. 11 is a diagram showing an internal configuration of the orthogonal detector 21 shown in FIG. 10. This orthogonal detector 21 includes a complex multiplier 221, root roll-off filters (RRFs) 222-1 and 222-2, a loop filter (LF) 224, a numerical control oscillator (NCO) 225, a pilot-signal extracting unit 211, a pilot-signal averaging unit 212, a phase-error-table generator 213, and a phase error table 214. The complex multiplier 221, the root roll-off filters 222-1 and 222-2, the loop filter 224, and the numerical control oscillator 225 have functions equivalent to those shown in FIG. 6, respectively.

Figure 6:
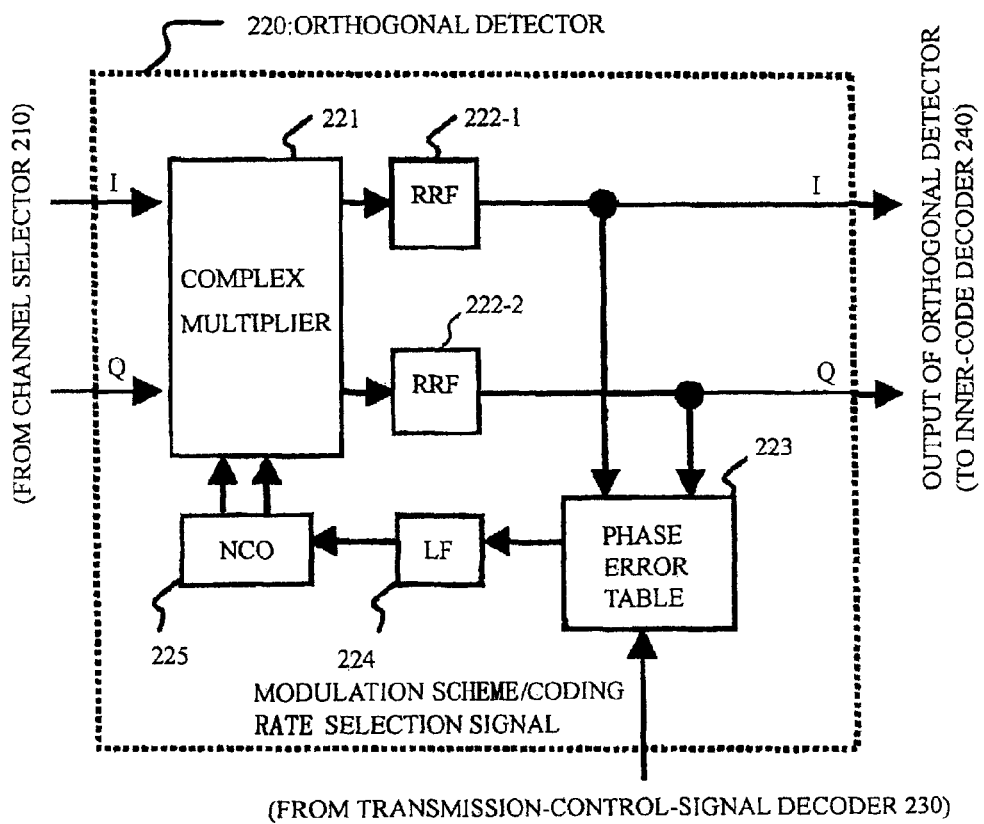
FIG. 6 is a diagram showing a configuration of an orthogonal detector of the receiving apparatus according to the prior art.

When the orthogonal detector 220 in the prior art shown in FIG. 6 and this orthogonal detector 21 are compared, the orthogonal detectors are different in that a function of the phase error table 214 in the orthogonal detector 21 is different from that of the phase error table 223 in the orthogonal detector 220 in the prior art and the orthogonal detector 21 includes the pilot-signal extracting unit 211, the pilot-signal averaging unit 212, and the phase-error-table generator 213.

Functions of the complex multiplier 221, the root roll-off filters 221-1 and 222-2, the loop filter 224, and the numerical control oscillator 225 are the same as those shown in FIG. 6. Therefore, further description of the functions is omitted. The pilot-signal extracting unit 211 extracts pilot signal portions from outputs of the root roll-off filters 222-1 and 222-2 using a pilot timing signal input from the transmission-control-signal decoder 22 shown in FIG. 10. The transmission-control-signal decoder 22 is input with a synchronous baseband signal converted by the orthogonal detector 21, detects a modulation scheme and a coding rate and outputs a modulation scheme/coding rate selection signal, and detects a pilot signal and outputs a pilot timing signal.

Pilot signals extracted by the pilot-signal extracting unit 211 are transmitted in order of symbols "00000", "00001", "00010", . . . , "11110", and "11111" in the case of, for example, 32APSK. Therefore, the pilot-signal averaging unit 212 accumulates, for each of the symbols, signal points of pilot signals periodically transmitted and calculates an average of signal point positions on an I-Q plane thereof. For example, when signal points of pilot signals corresponding to the symbol "00000" are $\{I_1,Q_1\}$ $\{I_2,Q_2\}$ $\{I_3,Q_3\}$ ... $\{I_N,Q_N\}$, the pilot-signal averaging unit 212 calculates the following:

$$\left\{ \sum_{n=1}^{N} I_n, \sum_{n=1}^{N} Q_n \right\}$$

Similarly, concerning the respective symbols "00001" to "11111", the pilot-signal averaging unit 212 also calculates averages thereof and outputs values of the averages. The phase-error-table generator 213 generates the phase error table 214 using the values. Specifically, the phase-error-table generator 213 extracts signal points, averages of signal point positions of the respective symbols of which are on the same circumferences, collects the signal points for each of circumferential radiuses, and generates a phase error table in the signal points.

Figure 12:
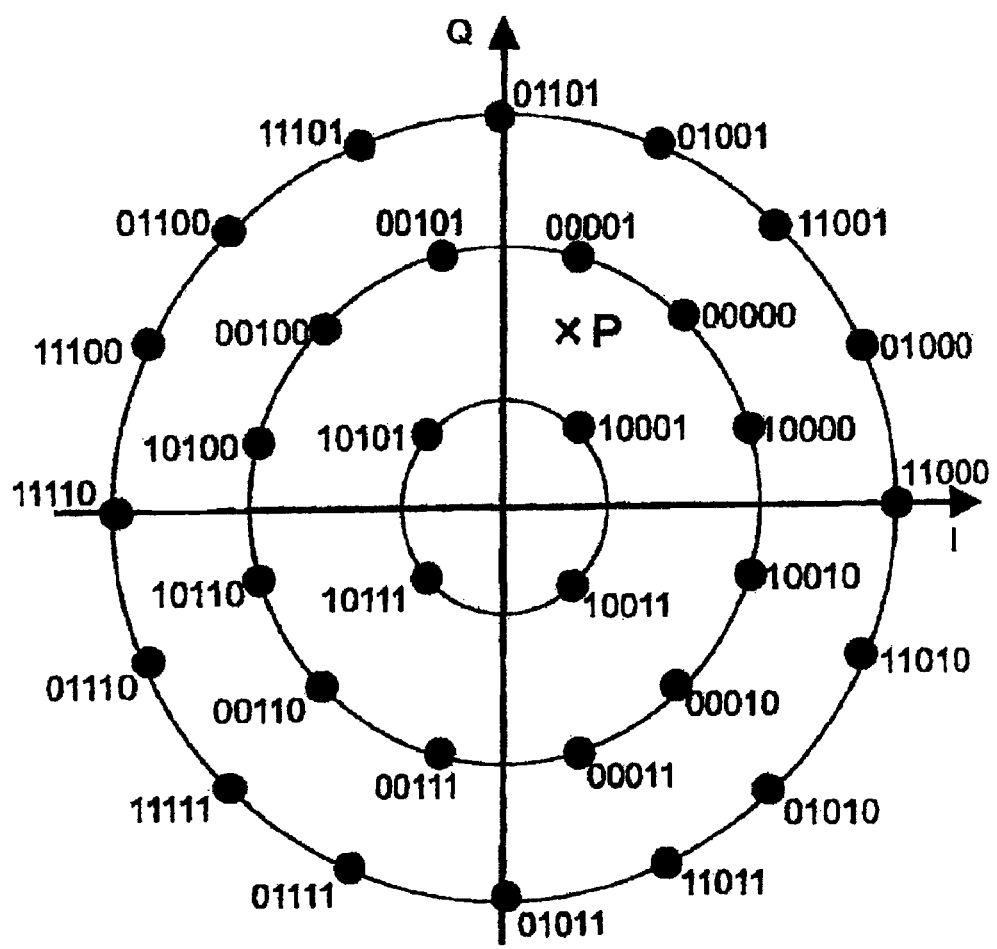
FIG. 12 is a diagram showing an example of an average of signal point positions of respective symbols of 32APSK.
Figure 13:
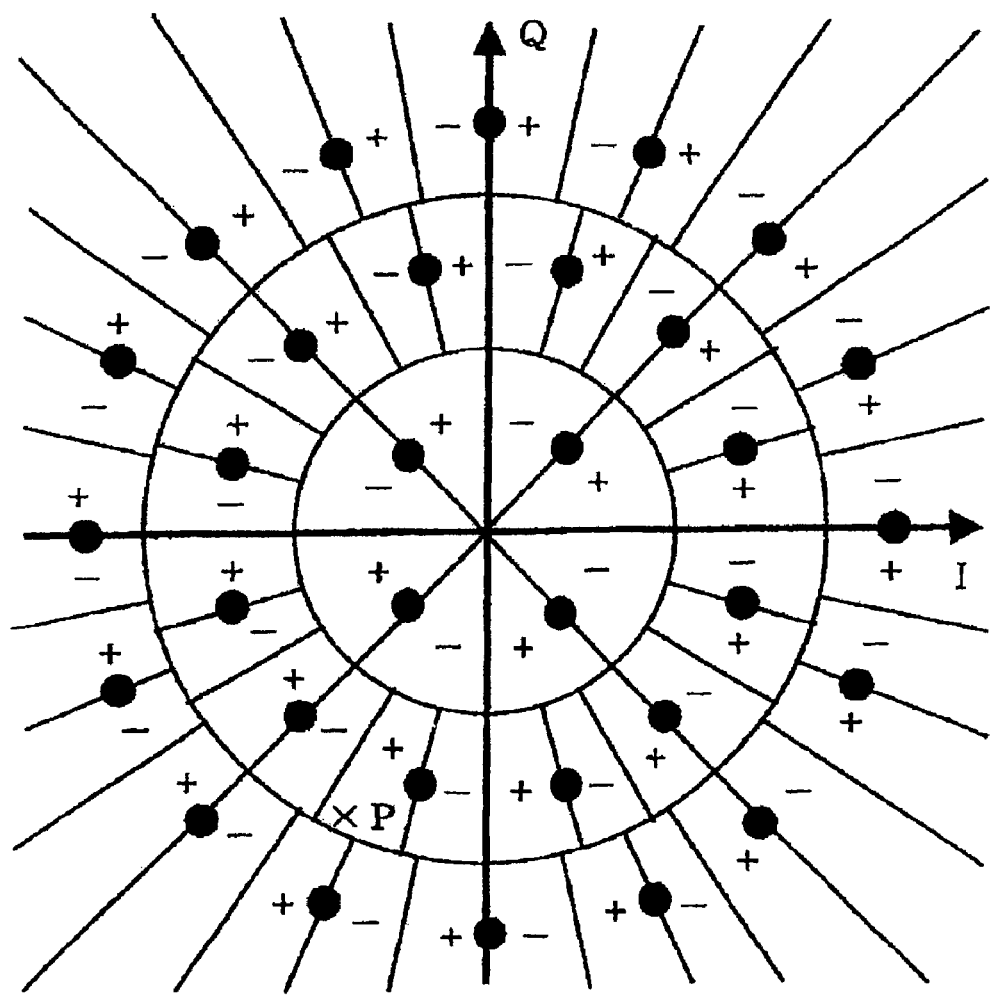
FIG. 13 is a diagram showing a phase error table generated from the average of the signal point positions.

FIG. 12 is a diagram showing averages of signal point positions of the respective symbols. In this case, the phase-error-table generator 213 generates phase error table values shown in FIG. 13 and overwrites the corresponding phase error table values on addresses of modulation schemes and coding rates of the phase error table 214. As the phase error table values, two concentric circles are drawn in intermediate parts among three concentric circles formed by connecting the signal point positions of the averages in the respective symbols, straight lines are drawn from an intersection of an I axis and a Q axis toward the respective signal points and intermediate parts among the signal points with respect to an inner side portion where inner sides of the two concentric circles overlap, a middle side portion between the two concentric circles, and an outer side portion where outer sides of the two concentric circles overlap. + or − signs is allocated to areas surrounded by the straight lines and the concentric circles. For example, when a reception signal point is present in a position of a P point in FIG. 13, since a sign of an area to which the P point belongs is +, the phase error table 214 outputs a positive value.

Figure 16:
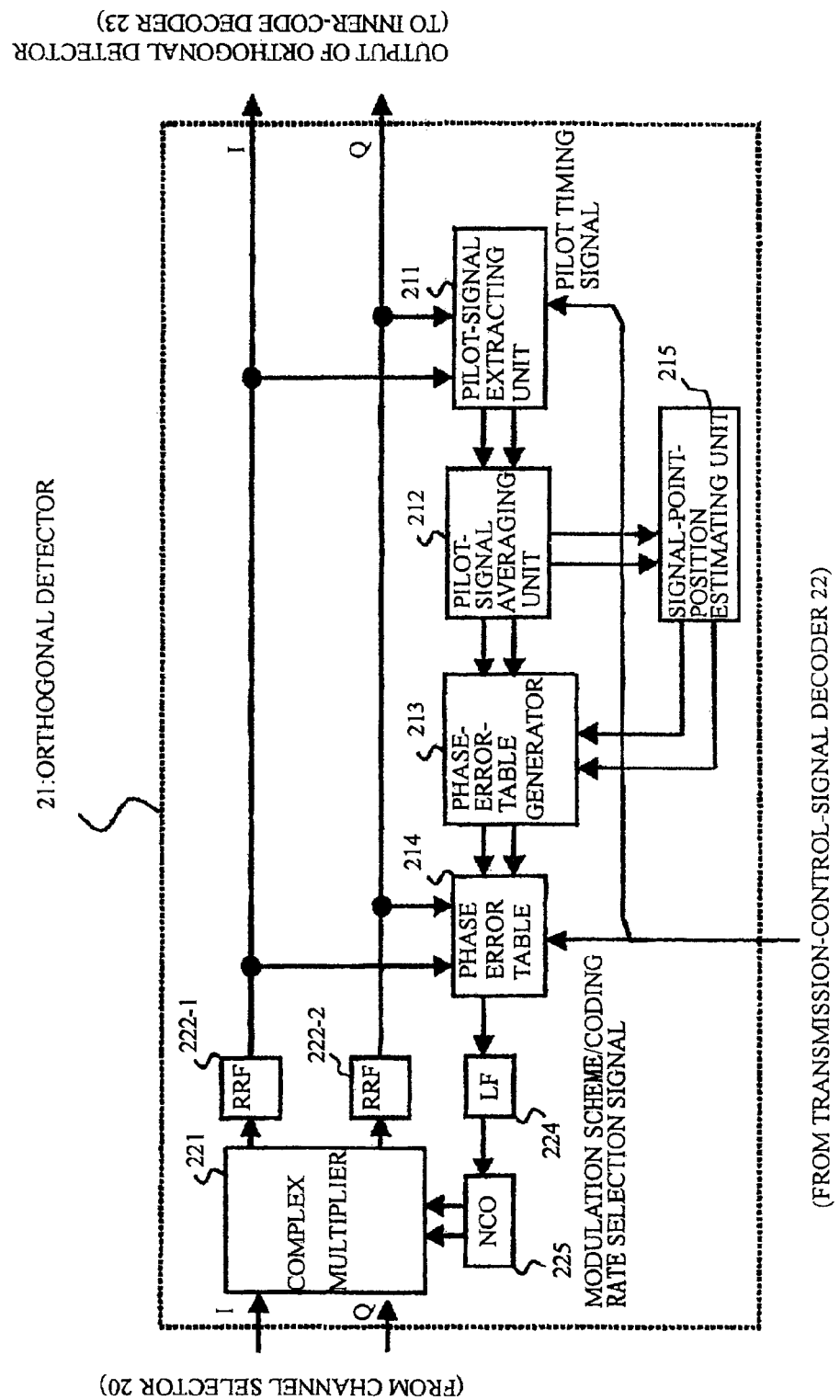
FIG. 16 is a diagram showing a configuration of the orthogonal detector of the receiving apparatus according to the embodiment of the present invention.

When a signal point arrangement has plural signal points on concentric circles as in the signal point arrangement shown in FIG. 12 and one or more symbols corresponding to the signal points on the respective concentric circle are transmitted as pilot signals, a figure showing an internal configuration of the orthogonal detector 21 is like FIG. 16. A difference from the orthogonal detector shown in FIG. 11 is only that the orthogonal detector 21 includes a signal-point estimating unit 215 that estimates signal points of symbols not transmitted as pilot signals from symbols transmitted as pilot signals. The signal-point estimating unit 215 estimates the signal points of the symbols not transmitted as pilot signals from signal point positions of the symbols on the concentric circles transmitted as the pilot signals. In other words, the signal-point estimating unit 215 estimates the signal point positions of the symbols not transmitted as pilot signals from a condition that relative angles from the signal point positions of the symbols on the concentric circles transmitted as the pilot signals are equal to those of the signal point positions used for the transmission. Consequently, signal point positions of all the symbols can be acquired. Processing by the phase-error-table generator 213 and subsequent processing are the same as those shown in FIG. 11. Therefore, further description of the processing is omitted.

The phase error table 223 according to the prior art shown in FIG. 6 is used with fixed table values written therein in advance. In the phase error table 214, table values can be rewritten by the phase-error-table generator 213. Therefore, even when a transmission channel characteristic changes because of aged deterioration of a satellite relay, a change in a back-off amount, or the like, the receiving apparatus 2 can always perform optimum phase error detection following the change. It is possible to perform stable synchronous detection in which cycle slip less easily occurs.

Figure 14:
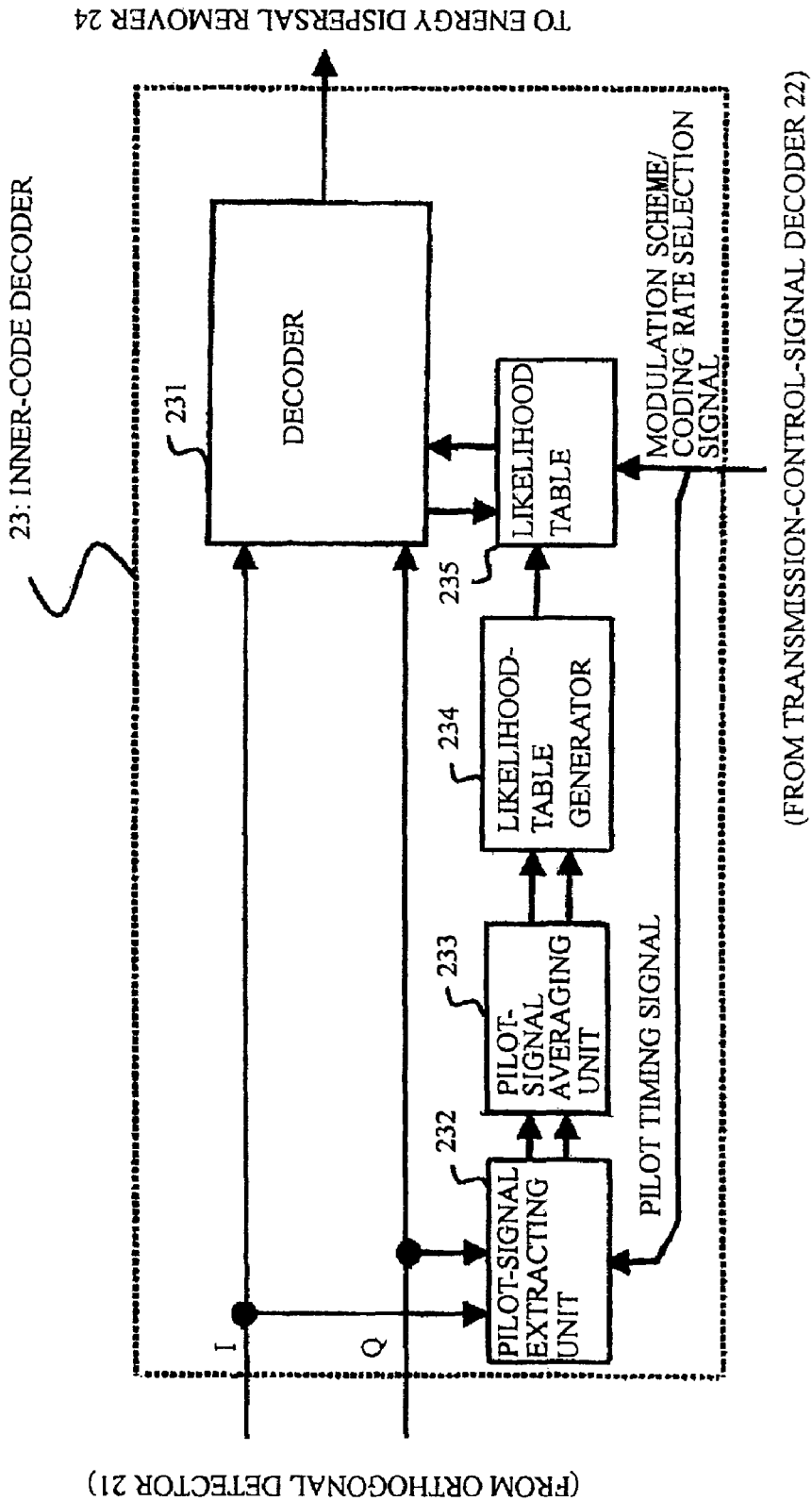
FIG. 14 is a diagram showing a configuration of an inner-code decoder of the receiving apparatus according to the embodiment of the present invention.

FIG. 14 is a diagram of an internal configuration of the inner-code decoder 23 shown in FIG. 10. This inner-code decoder 23 includes a decoder 231, a pilot-signal extracting unit 232, a pilot-signal averaging unit 233, a likelihood-table generator 234, and a likelihood table 235. The decoder 231 has a function equivalent to that of the decoder 241 shown in FIG. 7.

Figure 7:
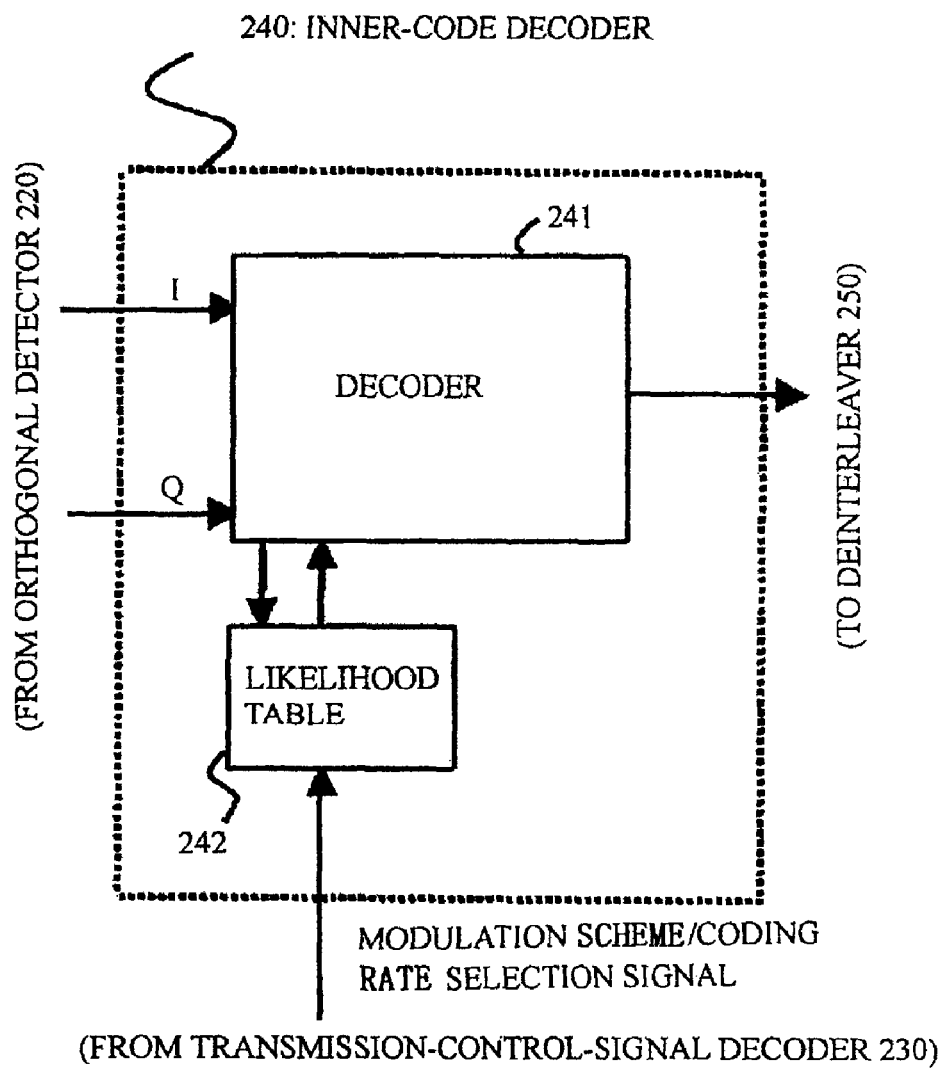
FIG. 7 is a diagram showing a configuration of an inner-code decoder of the receiving apparatus according to the prior art.

When the inner-code decoder 240 in the prior art shown in FIG. 7 and this inner-code decoder 23 are compared, the inner-code decoders are different in that the inner-code decoder 23 includes the pilot-signal extracting unit 232, the pilot-signal averaging unit 233, the likelihood-table generator 234, and the likelihood table 235 having a function different from that of the likelihood table 242 shown in FIG. 7.

A function of the decoder 231 is the same as that of the decoder 241 shown in FIG. 7. Therefore, further description of the function is omitted. Functions of the pilot-signal extracting unit 232 and the pilot-signal averaging unit 233 are the same as those of the pilot-signal extracting unit 211 and the pilot-signal averaging unit 212 of the orthogonal detector 21 shown in FIG. 11, respectively. Therefore, further description of the functions is omitted. The orthogonal detector 21 and the inner-code decoder 23 may share these units. Therefore, for example, when a pilot signal is 32APSK, output of the pilot-signal averaging unit 233 is the same as that shown in FIG. 12.

The likelihood-table generator 234 generates likelihood table values concerning respective bits forming a symbol. Since it is difficult to illustrate the likelihood table values, a procedure for generating a likelihood table value of a most significant bit is described as an example of the likelihood table values.

In FIG. 12, when a reception signal point is the point P, a posterior probability of transmission of zero and a posterior probability of transmission of 1 can be calculated by the following Expression 1 and Expression 2, respectively:

$$P_{P0} = \sum_{\substack{i=0:31 \\ \text{Most significant bit of } S_i \text{ is } 0}} \frac{1}{\sigma\sqrt{2\pi}} \exp\left\{-\frac{dist(P:S_i)^2}{2\sigma^2}\right\} \quad \text{[Expression 1]}$$

$$P_{P1} = \sum_{\substack{i=0:31 \\ \text{Most significant bit of } S_i \text{ is } 1}} \frac{1}{\sigma\sqrt{2\pi}} \exp\left\{-\frac{dist(P:S_i)^2}{2\sigma^2}\right\} \quad \text{[Expression 2]}$$

$dist(P:S_i)$ indicates a distance from the point P to a signal point of a symbol of a value i (if i=1, symbol 00001). σ indicates a standard deviation of Gaussian noise.

In general, a Log-Likelihood Ratio (LLR) further calculated from values of these posterior probabilities is set as a value of the likelihood table 235. In that case, a table value of the point P is calculated by using the following Expression 3:

$$LLR_P = \ln\left(\frac{P_{P1}}{P_{P0}}\right) = \ln\left(\frac{\sum_{\substack{i=0:31 \\ \text{Most significant bit of } S_i \text{ is } 1}} \exp\left\{-\frac{dist(P:S_i)^2}{2\sigma^2}\right\}}{\sum_{\substack{i=0:31 \\ \text{Most significant bit of } S_i \text{ is } 0}} \exp\left\{-\frac{dist(P:S_i)^2}{2\sigma^2}\right\}}\right) \quad \text{[Expression 3]}$$

A likelihood table value for a most significant bit is generated by setting P at all points on an I-Q plane and calculating this table value $LLR_P$. Similarly, all table values to be output to the likelihood table 235 can be calculated by also calculating $LLR_P$ concerning each of second to fifth bits and setting $LLR_P$ as a table value. The likelihood-table generator 234 overwrites the corresponding values on addresses of modulation schemes and coding rates of the likelihood table 235 with these table values.

Figure 17:
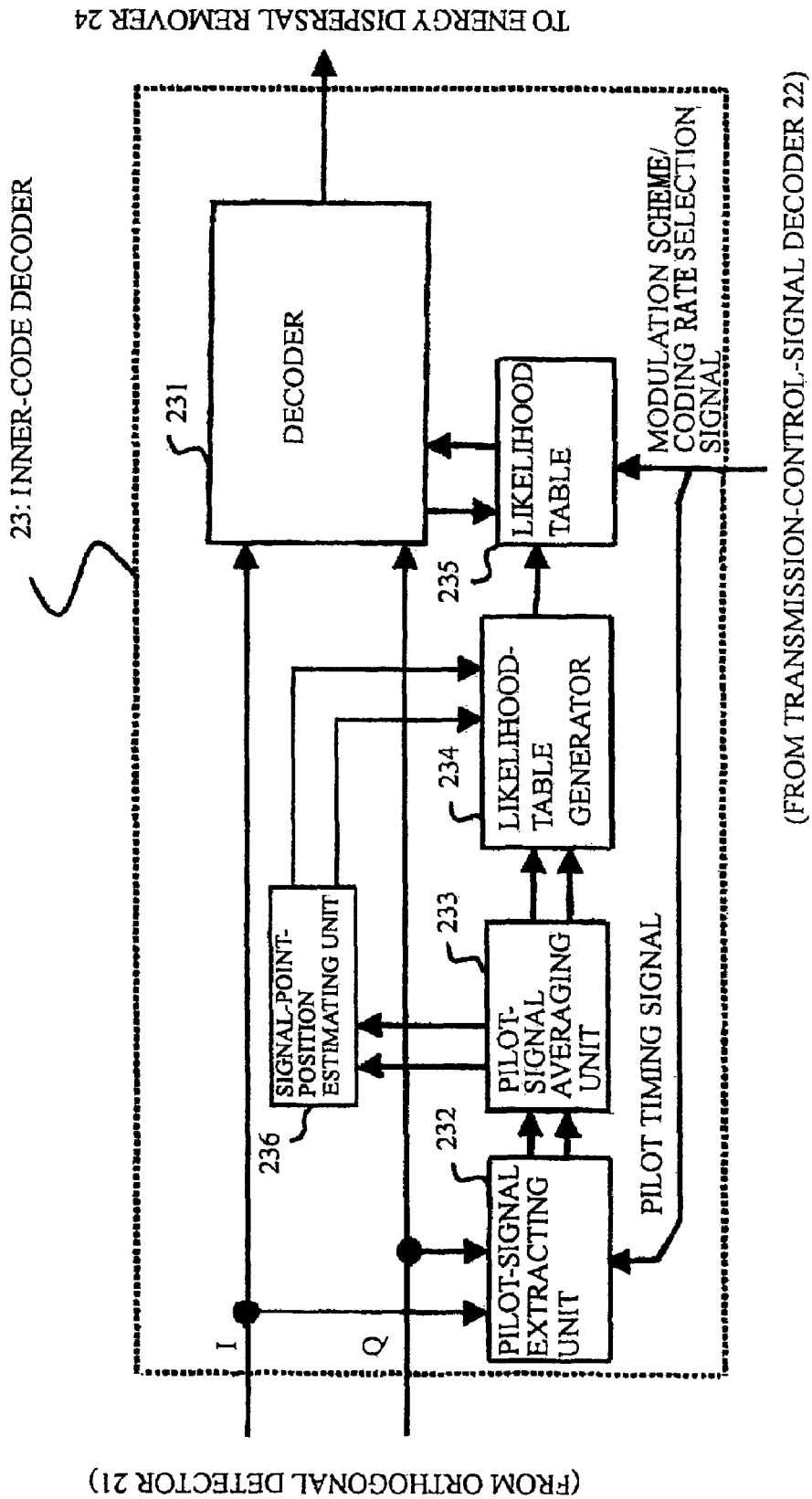
FIG. 17 is a diagram showing a configuration of the inner-code decoder of the receiving apparatus according to the embodiment of the present invention.

When a signal point arrangement has plural signal points on concentric circles as in the signal point arrangement shown in FIG. 12 and one or more symbols corresponding to the signal points on the respective concentric circles are transmitted as pilot signals, a figure showing an internal configuration of the inner-code decoder 23 is like FIG. 17. A difference from the inner-code decoder shown in FIG. 14 is only that the inner-code decoder 23 includes a signal-point estimating unit 236 that estimates signal points of symbols not transmitted as pilot signals from symbols transmitted as pilot signals. The signal-point estimating unit 236 estimates the signal points of the symbols not transmitted as pilot signals from signal point positions of the symbols on the concentric circles transmitted as the pilot signals. In other words, the signal-point estimating unit 236 estimates the signal point positions of the symbols not transmitted as pilot signals from a condition that relative angles from the signal point positions of the symbols on the concentric circles transmitted as the pilot signals are equal to those of the signal point positions used for the transmission. Consequently, signal point positions of all the symbols can be acquired. Therefore, processing by the likelihood-table generator 234 and subsequent processing are the same as those shown in FIG. 14. Therefore, further description of the processing is omitted.

The likelihood table 242 according to the prior art shown in FIG. 7 is used with fixed table values written therein in advance. In the likelihood table 235, table values can be rewritten by the likelihood-table generator 234. Therefore, even when a transmission channel characteristic changes because of aged deterioration of a satellite relay, a change in a back-off amount, or the like, the receiving apparatus 2 can always perform optimum code decoding following the change. It is possible to reduce required C/N.

The configurations and the operations of the orthogonal detector 21 shown in FIG. 11 and the inner-code decoder 23 shown in FIG. 14 are described by using 32APSK as an example. However, the orthogonal detector 21 and the inner-code decoder 23 can be configured and act the same concerning other kinds of digital modulation, for example, modulation schemes such as 16APSK, 32QAM, and 16QAM.

[Multiplexing Frame Configuration]

Figure 15:
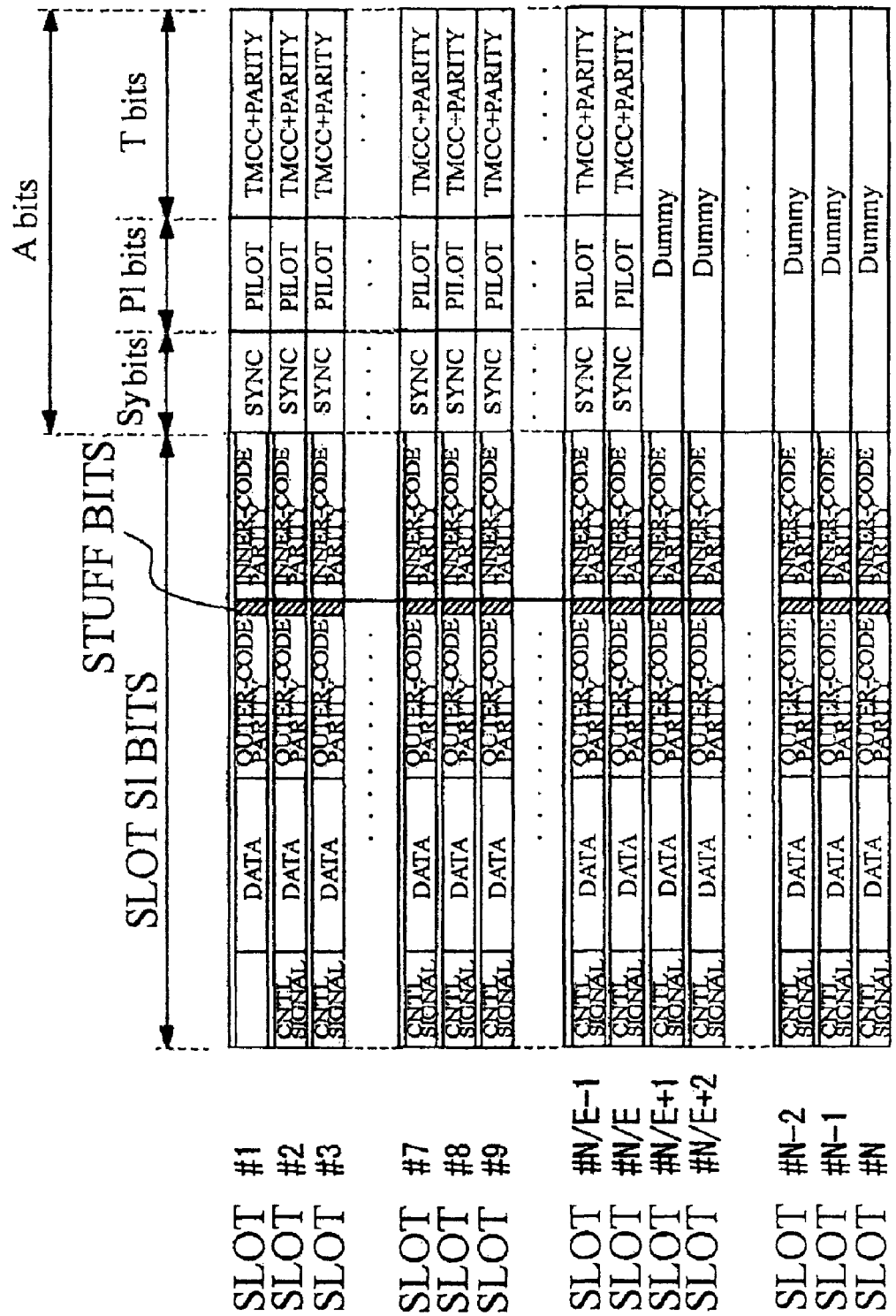
FIG. 15 is a diagram showing the structure of a multiplexing frame used in the embodiment of the present invention.

Next, the structure of a multiplexing frame used for the transmitting apparatus 1 shown in FIG. 8 and the receiving apparatus 2 shown in FIG. 10 is described. FIG. 15 is a diagram showing the structure of a multiplexing frame used in the embodiment of the present invention. The transmitting apparatus 1 shown in FIG. 8 designates a transmission system and a coding rate by using the multiplexing frame structure shown in FIG. 15. The receiving apparatus 2 shown in FIG. 10 performs demodulation and decoding an error correction code on the basis of this frame structure.

In this multiplexing frame structure, a slot is formed by control information, data, an outer-code parity, a stuff bit, and an inner-code parity. The length of the slots is Sl bits and the number of slots forming one frame is N. The multiplexing frame includes, separately from the slots, synchronization, pilot, and TMCC and an error correction parity thereof. The lengths thereof are Sy bits, Pl bits, and T bits, respectively. In slots #1 to #N/E, the numbers of bits Sy×N/E, Pl×N/E, and T×N/E are allocated thereto, respectively.

The stuff bit is a bit that is inserted only when the bit is necessary to facilitate processing in byte units. Therefore, the bit is not inserted when it is unnecessary to facilitate processing in byte units. For example, it is assumed that the number of bits that can be secured as control information 182 bits and X bytes of data follows after the bits. In this case, since the control information is formed by 182 bits=22 bytes+6 bits, when it is attempted to process the control information on the basis of byte units, it is necessary to take the trouble of shifting the following data of byte units by two bits and write the data while connecting the data with 6 bits write the data at the end of the control information. The receiving apparatus 2 needs to restore this connection to the original state and restore the data to the original data in byte units. In such a case, it is more advantageous in terms of realizing hardware to set 6 bits among the bits that can be used for the control information as stuff bits.

Figure 1:
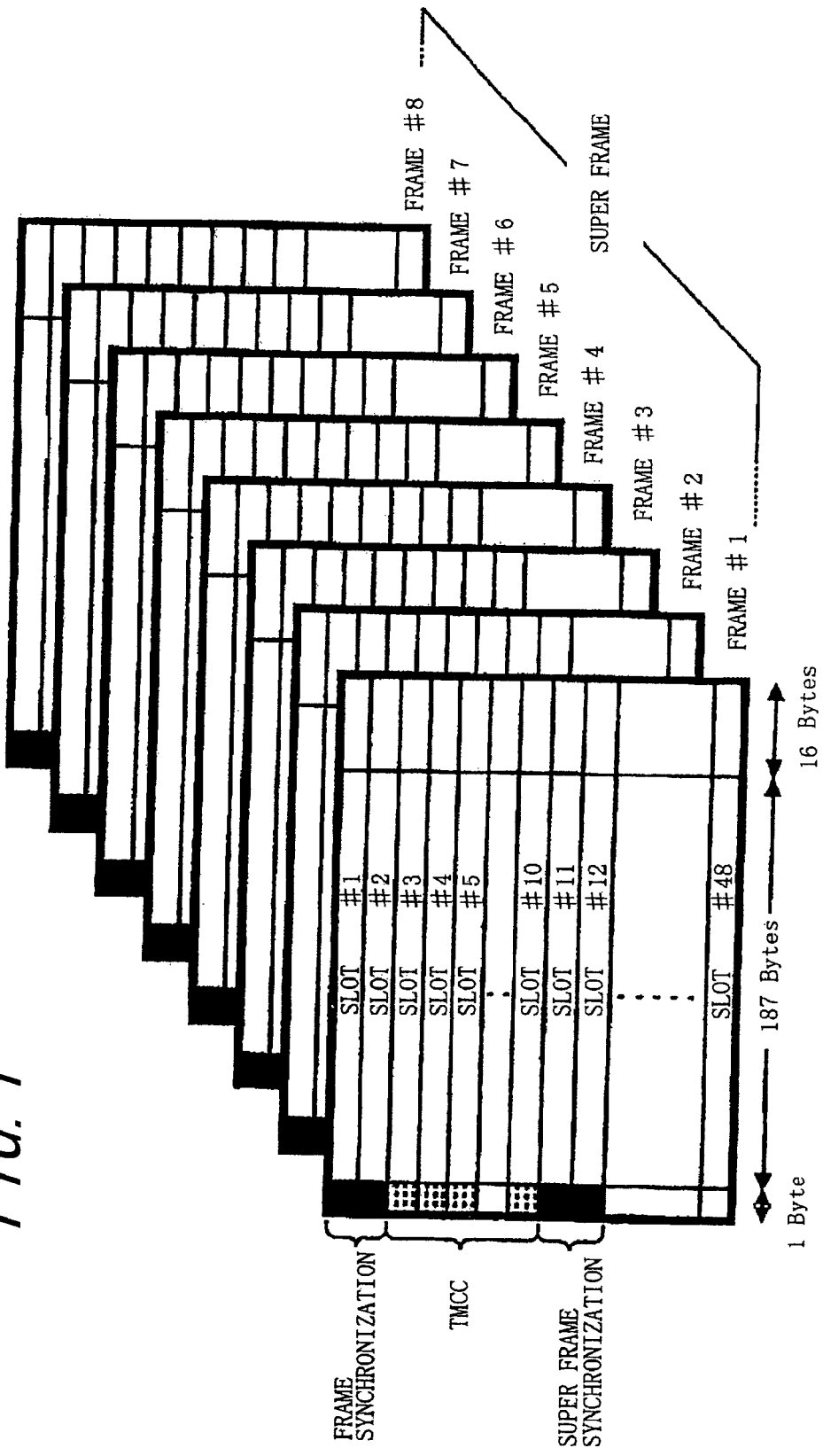
FIG. 1 is a diagram showing a multiplexing frame structure of a BS digital broadcast.

When this multiplexing frame structure and the multiplexing frame structure in the prior art shown in FIG. 1 are compared, the multiplexing frame structures are different in that, whereas one slot includes only the 187 byte data and the 16 byte outer-code parity in FIG. 1, one slot also includes the inner-code parity in the multiplexing frame structure used in the embodiment of the present invention. Consequently, the rule for inserting dummy slots only has to taken into account frequency efficiency of a modulation scheme itself.

Figure 2:
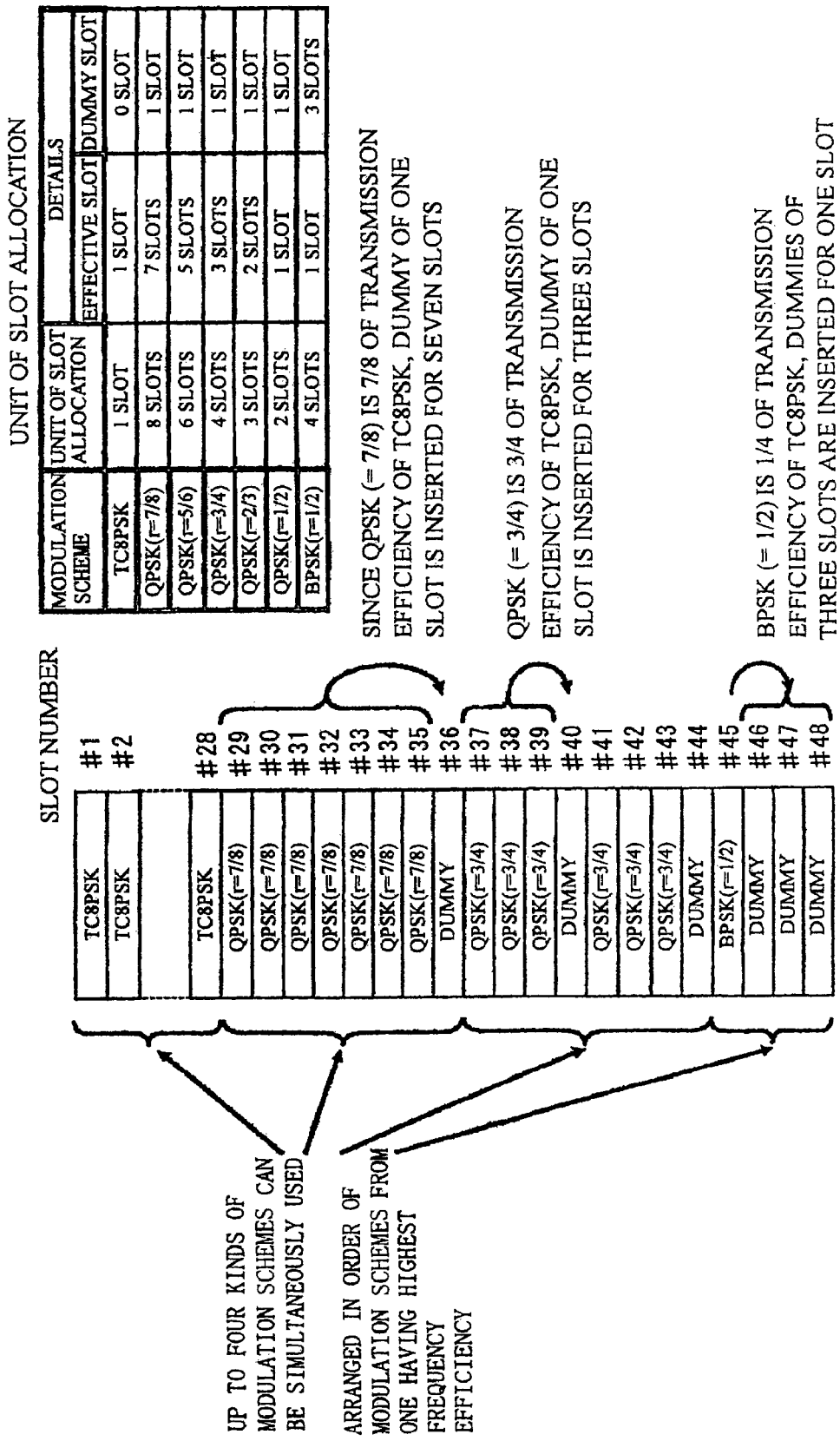
FIG. 2 is a diagram showing rules for allocation of slots.

Table 2 and Table 3 show a dummy slot allocation rule adopted when modulation schemes having highest frequency efficiency among modulation schemes to be used are 32APSK (or 32QAM) and 16APSK (or 16QAM). When the table shown in FIG. 2 is compared with Table 2 and Table 3, the tables are different mainly in that the number of dummy slots is determined without depending on a coding rate.

TABLE 2

Unit of slot allocation (when a modulation scheme having highest efficiency is 32APSK or 32QAM)

| Modulation scheme | Unit of slot allocation | Details | |
|---|---|---|---|
| | | Effective slot | Dummy slot |
| 32APSK or 32QAM | 1 slot | 1 slot | 0 slot |
| 16APSK or 16QAM | 5 slots | 4 slots | 1 slot |
| 8 PSK | 5 slots | 3 slots | 2 slots |
| QPSK | 5 slots | 2 slots | 3 slots |
| BPSK | 5 slots | 1 slot | 4 slots |

TABLE 3

Unit of slot allocation (when a modulation scheme having highest efficiency is 16APSK or 16QAM)

| Modulation scheme | Unit of slot allocation | Details | |
|---|---|---|---|
| | | Effective slot | Dummy slot |
| 16APSK or 16QAM | 1 slot | 4 slots | 0 slot |
| 8 PSX | 4 slots | 3 slots | 1 slot |
| QPSK | 4 slots | 2 slots | 2 slots |
| BPSK | 4 slots | 1 slot | 3 slots |

In FIG. 15, N indicates the number of slots per frame. Since a bit rate per one slot is set to about 1.1 Mbps in ISDB-S, it is desirable that an actual value of N satisfies this condition.

Therefore, when modulation schemes having maximum efficiency among a group of modulation schemes adopted in a transmission system to be configured are 8PSK (3 bps/Hz), 16APSK (or 16QAM, 4 bps/Hz), and 32APSK (or 32 QAM, 5 bps/Hz), transmission efficiencies of the modulation schemes are 1.5 times, 2 times, and 2.5 times as large as that of TC8PSK (r=2/3, 2 bps/Hz) of ISDB-S. Therefore, it is desirable that the numbers of slots N are 48 slots×1.5=72 slots, 48 slots×2=96 slots, and 48 slots×2.5=120 slots, respectively.

Since, in general, a modulation scheme having low efficiency is adopted for a main signal transmitted in a modulation scheme among a group of modulation schemes to be adopted and excess modulation symbols are occupied because of the modulation scheme, a dummy area is provided below areas of synchronization, pilot, and TMCC and the error correction parity thereof in order to secure a time domain for the modulation scheme. The dummy area is an imaginary area and data in this area is not actually transmitted, it is unnecessary to provide a memory area corresponding to the dummy area. A value of E that specifies an amount of dummy is a ratio of frequency efficiency of a modulation scheme for transmitting these signals to frequency efficiency of the modulation scheme having maximum efficiency among the group of modulation schemes to be adopted. For example, when the modulation scheme having maximum efficiency among the group of modulation schemes to be adopted is 32APSK (or 32QAM, 5 bps/Hz) and the modulation scheme for transmitting these signals is BPSK (1 bps/Hz), the value of E is 5. Similarly, when the modulation scheme having maximum efficiency among the group of modulation schemes to be adopted is 16APSK (or 16QAM, 4 bps/Hz) and the modulation scheme for transmitting these signals is BPSK (1 bps/Hz), the value of E is 4.

The slot length Sl depends on the length of a code. In recent years, in a standardized DVB-S2 system, an LDPC code having code length of 64800 bits is used. It is expected that codes in this class becomes the mainstream in future. Therefore, it is desirable to set the slot length Sl to the same degree (a condition 1).

The MPEG-2 TS (having packet length of 188 bytes, 187 bytes excluding a synchronization code of lead one byte=1496 bits) is still the mainstream of the digital broadcast in future. Therefore, it is desirable that the MPEG-2 TS can be sufficiently transmitted (a condition 2).

In order to sufficiently transmit data of one slot in plural modulation schemes, the slot length Sl needs to be a least common multiple of the numbers of bits per modulation symbol of the respective modulation schemes. For example, when the group of modulation schemes adopted in the transmission system are BPSK (1 bit/symbol), QPSK (2 bits/symbol), 8PSK (3 bits/symbol), 16APSK (or 16QAM, 4 bits/symbol), and 32APSK (or 32QAM, 5 bits/symbol), the least common multiple is 2$\times$2$\times$3$\times$5=60 bits and the slot length Sl needs to be an integral multiple of the least common multiple. When the slot length needs to be set in byte units, the slot length further needs to be a multiple of 8. In that case, the slot length needs to be an integral multiple of 120 which is the least common multiple of 60 and 8 (a condition 3).

When a periodical LDPC code adopted in DVB-S2 is used for an inner code, a period M thereof needs to be about 360 because of easiness of formation of a code. When M is set as a factor of a data unit 187 bytes=23$\times$11$\times$17 bits to be transmitted, since distribution of data and LDPC parities can be flexibly performed, this condition is satisfied, and M is equal to 374. It is desirable to set the slot length Sl integral multiple of 374=2$\times$11$\times$17 (a condition 4).

In order to satisfy the conditions 2, 3, and 4, when it is unnecessary to perform processing in byte units, the slot length only has to be integral multiple of LCM(374,60)= LCM(2$\times$11$\times$17, 2$\times$2$\times$3$\times$5)=2$\times$2$\times$3$\times$5$\times$11$\times$17=11220 bits (LCM: least common multiple). Further, in order to satisfy the condition 1, a number of the same degree as 64800 only has to be set to 11220$\times$=56100 and 11220$\times$6=67320. However, the latter exceeds $2^{16}-1$=65535 that can be represented by 16 bits. Therefore, the latter is undesirable because it is likely that the size of hardware suddenly increases. Therefore, the slot length Sl is desirably set to 56100 bits. In order to flexibly perform distribution of LDPC and parities as data, a sum of the numbers of bits of the control information, the outer-code parity, and the stuff bit (when the stuff bit is not used, a sum of the numbers of bits of the control information, the outer-code parity; the same applies in the following description) needs to be integral multiple of the period M (=374) of the LDPC. When a unit of data about to be transmitted is not 187 bytes, for example, in the case of 188 bytes, 189 bytes, 190 bytes, and 192 bytes, the periods M of the LDPC need to be set to 376, 378, 380, and 384, respectively, according to the same calculation. The slot lengths in this case are 62040, 60480, 63840, and 65280, respectively.

When it is necessary to perform processing in byte units, the slot length only has to be integral multiple of LCM(374, 120)=LCM(2$\times$11$\times$17, 2$\times$2$\times$2$\times$3$\times$5)=2$\times$2$\times$2$\times$3$\times$5$\times$11$\times$17=22440. As a number of the same degree as 64800 in the condition 1, there are 22440$\times$2=44880 and 22440$\times$3=67320. However, the latter is not desirable because of the same reason. Therefore, it is desirable to set the slot length Sl to 44880. In order to flexibly perform distribution of data and LDPC parities, a sum of the numbers of bits of the control information, the outer-code parity, and the stuff bit needs to be integral multiple of the period M (=374) of the LDPC. When a unit of data to be transmitted is not 187 bytes, for example, in the case of 188 bytes, 189 bytes, 190 bytes, and 192 bytes, the periods M of the LDPC need to be set to 376, 378, 380, and 384, respectively. The sloth lengths in this case are 62040, 64260, 64980, and 65280, respectively.

Concerning a synchronization signal, in ISDB-S, a frame synchronization 20 symbols and super frame 20 symbols are inserted. These synchronization signals are designed with an object that acquisition can be stably performed at C/N=about 0 dB at which BPSK (a convolutional code, r=1/2) can be received. However, in a system adopting an LDPC code, since C/N as high as about C/N=about −2 dB can be received in a modulation scheme having the same efficiency, i.e., BPSK (LDPC, r=1/2), a synchronization code needs to be longer.

Assuming that a modulation signal for one frame is divided into N portions, which is the same as the number of slots, and slot synchronization or frame synchronization is added to the respective portions, when the slot synchronization and the frame synchronization are 24 symbols and the modulation scheme having maximum efficiency among the group of modulation schemes to be adopted is 32APSK (or 32QAM), since N=120, 24$\times$120=2880 symbols are necessary. When the modulation scheme for transmitting a synchronization signal is BPSK, since N/E=24, Sy needs to be set to 120 bits in order to accommodate data for 2880 symbols. In this case, a synchronization signal per one frame is 120$\times$24=2880 bits.

Similarly, when the modulation scheme having maximum efficiency among the group of modulation schemes to be adopted is 16APSK (or 16QAM), since N=96, 24$\times$96=2304 symbols are necessary. When the modulation scheme for transmitting a synchronization signal is BPSK, since N/E=24, Sy needs to be set to 96 bits in order to accommodate data for 2304 symbols. In this case, a synchronization signal per one frame is 96$\times$24=2304 bits.

When APSK or QAM modulation is used, a nonlinear characteristic of a satellite relay is compensated in the receiving apparatus 2 and an area of pilot signals for improving reception performance is also prepared.

Assuming that pilots of 32 symbols are added to respective slots, when the modulation scheme having maximum efficiency among the group of modulation schemes to be adopted is 32APSK (or 32QAM), since N=120, 32$\times$120=3840 symbols per one frame are necessary. When the modulation scheme for transmitting a pilot signal is BPSK, since N/E=24, Pl needs to be set to 160 bits in order to accommodate data for 3840 symbols.

Similarly, assuming that pilots of 16 symbols are added to the respective slots, when the modulation scheme having maximum efficiency among the group of modulation schemes to be adopted is 16APSK (or 16QAM), since N=96, 16×96=1536 symbols per one frame are necessary. When the modulation scheme for transmitting a pilot signal is BPSK, since N/E=24, P1 needs to be set to 64 bits in order to accommodate data for 1536 symbols.

In ISDB-S, 0.32% of all symbols is allocated to TMCC, 1.92% is allocated to phase synchronization burst, and 2.24% in total is allocated. Since both the TMCC and the phase synchronization burst are BPSK modulation, the TMCC and the phase synchronization burst can be used for synchronization reinforcement. However, although the TMCC contributes to transmission of the control information, the phase synchronization burst is only modulated by a pseudo random code and does not contribute to information transmission. The TMCC signal is periodically transmitted in a phase synchronization burst like manner and a function of the phase synchronization burst is also given to the TMCC signal.

Therefore, a ratio of the TMCC signal to all the symbols needs to be set to 2.24% or set to higher to cope with reception up to lower C/N. The TMCC signal has a simple integer ratio to the number of symbols transmitted in all the slots.

When Sl=44880, the number of symbols per one frame transmitted in all the slots is 44880×120/5=1077120 symbols. It is assumed that the TMCC signal for one frame is equally divided into N, which is the same as the number of slots, further equally divided into X, and, as in ISDB-S, a group of symbols equal to or smaller than 204 symbols is created, and TMCC of 4 symbols is added to the group of symbols.

When the modulation scheme having maximum efficiency among the group of modulation schemes to be adopted is 32APSK (or 32QAM), since N=120, symbols equally divided into 120 first are 1077120/120=8976 symbols. The symbols are further equally divided into X. In this case, as a combination of symbols divisible by an integer ratio, there are 187 symbols in X=48, 176 symbols in X=51, 136 symbols in X=66, 132 symbols in X=68, and the like. When TMCC of 4 symbols is added to the group of symbols, ratios of TMCC to all the symbols are 2.138%, 2.273%, 2.941%, and 3.030%, respectively. Among these ratios, those secured to be equal to or higher than 2.24% are candidates. 136 symbols in X=66 (TMCC ratio is 2.941%) is adopted. In this case, the TMCC needs 4×66×120=316808 symbols per one frame. When the modulation scheme for transmitting TMCC is BPSK, since N/E=24, T needs to be set to 1320 bits in order to accommodate data for 31680 symbols.

Similarly, when the modulation scheme having maximum efficiency among the group of modulation schemes to be adopted is 16APSK (or 16QAM), the number of symbols per one frame transmitted in all the slots is 44880×96/4=1077120 symbols when Sl=44880 bits. Since N=96, symbols equally divided into 96 first are 1077120/96=11220 symbols. The symbols are further equally divided into X. In this case, as a combination of symbols divisible by an integer ratio, there are 187 symbols in X=60, 170 symbols in X=66, 165 symbols in X=68, 132 symbols in X=85, and the like. When TMCC of 4 symbols is added to the group of symbols, ratios of TMCC to all the symbols are 2.1390%, 2.3529%, 2.4242%, and 3.0303%, respectively. Among these ratio secured to be equal to or higher than 2.24%, 132 symbols in X=85 (TMCC ratio is 3.0303%) is adopted. In this case, the TMCC needs 4×85×96=32640 symbols per one frame. When the modulation scheme for transmitting TMCC is BPSK, since N/E=24, T needs to be set to 1360 bits in order to accommodate data for 32640 symbols.

As described above, according to the embodiment of the present invention, the transmitting apparatus 1 transmits, for each of the modulation schemes, symbols allocated to all signal points in order determined in advance as pilot signals. The receiving apparatus 2 extracts pilot signals from a received signal and rewrites the phase error table 214 and the likelihood table 235 with the pilot signals. Consequently, the receiving apparatus 2 can perform synchronous detection and inner code decoding on the basis of a table on which distortion of a transmission channel is reflected. Therefore, it is possible to realize improvement of a reception performance.

On the other hand, in the frame structure in the prior art shown in FIG. 1, there is a problem described below. Specifically, there is a problem in that the frame structure in the prior art assumes a convolutional code and cannot be applied to an LDPC code with large code length and the like that are used in recent years in, for example, DVB-S2, which is an European broadcast standard.

As shown in Table 1, the transmission mode that can be designated by the TMCC signal is configured such that frequency efficiency calculated as a product of frequency efficiency of a modulation scheme itself and a coding rate of an inner code is a simple integer ratio. When a transmission mode having lower frequency efficiency than TC8PSK is used, dummy slots equivalent to the fall in efficiency are arranged to fix a clock rate of a multiplexing frame. Therefore, for example, there is a problem in that a transmission mode of 8PSK (r=3/4) having frequency efficiency exceeding 2 cannot be allocated. Concerning this point, it is desirable that a modulation scheme and a coding rate can be arbitrarily combined to form a frame.

Therefore, in the embodiment of the present invention, the frame structure shown in FIG. 8 is used. Therefore, the transmitting apparatus 1 can also cope with an error correction code such as an LDPC having large code length and can arbitrarily combine a modulation scheme and a coding rate. Therefore, it is possible to efficiently transmit MPEG-2 TS and other digital data streams.

Specifically, according to the embodiment of the present invention, the transmitting apparatus 1 includes at least the frame generator 10, the LDPC encoders 11-1 and 11-2, the BCH encoders 11-3 and 11-4, the energy dispersers 12 and 13, the switch 14, the mapper 15, and the time division multiplexing/orthogonal modulating unit 16. The transmitting apparatus 1 transmits, on the basis of transmission control information written in a transmission control signal, multiplexed data having the frame structure in which plural slots including at least data, outer code parities, and inner code parities. In this case, by setting slot length to 44880 bits, it is possible to sufficiently transmit 187-byte information of sync byte removed MPEG-2 TS regardless of a modulation scheme. When a unit of data about to be transmitted is not 187 bytes, for example, when the unit is 188 bytes, 189 bytes, 190 bytes, and 192 bytes, by setting slot lengths in this case to 62040, 64260, 64980, and 65280, respectively, it is possible to sufficiently transmit the data regardless of a modulation scheme. When it is desired to set code lengths in byte units, by setting the code lengths to 62040, 60480, 63840, and 65280, respectively, it is possible to sufficiently transmit the data regardless of a modulation scheme.

When the modulation scheme having maximum efficiency is 32APSK or 32QAM, the number of slots forming a frame is set to 120, the number of bits of a synchronous code per one frame is set to 2880 bits, the same pattern is transmitted in odd-number-th modulation slots in units of 24 modulation symbols of the synchronous code, and bit-reversed patterns are alternately transmitted in even-number-th modulation slots. The number of symbols of a pilot signal per one frame is set to 3840 symbols and the pilot signal is transmitted in units of 32 modulation symbols. The number of bits of a transmission control signal per one frame is set to 31680 bits and the transmission control signal is transmitted in units of four modulation symbols.

When the modulation scheme having maximum efficiency is 16APSK or 16QAM, the number of slots forming a frame is set to 96, the number of bits of a synchronous code per one frame is set to 2304 bits, the same pattern is transmitted in odd-number-th modulation slots in units of 24 modulation symbols of the synchronous code, and bit-reversed patterns are alternately transmitted in odd-number-th modulation slots. The number of bits of a pilot signal per one frame is set to 1536 bits and the pilot signal is transmitted in units of 16 modulation symbols. The number of bits of a transmission control signal per one frame is set to 32640 bits and the transmission control signal is transmitted in units of four modulation symbols.

The receiving apparatus 2 includes the channel selector 20, the orthogonal detector 21, the transmission-control-signal decoder 22, the inner-code decoder 23, the energy dispersal remover 24, and the outer-code decoder 25. The transmission-control-signal decoder 22 performs control corresponding to the frame structure shown in FIG. 8. Therefore, it is possible to apply reception processing to a modulated carrier signal transmitted from the transmitting apparatus 1.

The present invention is described above with reference to the embodiment. However, the present invention is not limited to the embodiment and can be variously modified without departing from the technical idea thereof. For example, data does not need to be stored on addresses of the memory according to an array of the structure of the multiplexing frame shown in FIG. 8. A separate memory element may be prepared for each of signals. The receiving apparatus 2 does not need to store all pieces of information of the multiplexing frame shown in FIG. 8 and only has to be capable of accumulating only slots to be received.

The invention claimed is:

1. A transmitting apparatus used for a system that transmits data according to a digital modulation scheme for shifting amplitude and phase, the transmitting apparatus comprising:
   means for mapping, for each number of bits per symbol corresponding to respective signal points of the modulation scheme, transmission data to the signal points;
   means for applying, in predefined order, signal point mapping to all symbols allocated to the respective signal points of the modulation scheme;
   means for periodically time-division multiplexing a signal point signal generated by mapping the symbols in the predefined order on a signal point signal generated by mapping the transmission data to generate a time division multiplex signal; and
   means for applying orthogonal modulation to the generated time division multiplex signal and transmitting orthogonal modulated carrier signal,
   wherein the transmitting apparatus periodically time-division multiplexes the signal in predefined order, orthogonally modulates the signal, and transmits the signal with symbols allocated to the respective signal points of the digital modulation scheme set as pilot signals.

2. The transmitting apparatus according to claim 1, wherein the digital modulation scheme for shifting amplitude and phase is 16APSK, 16QAM, 32APSK, or 32QAM.

3. The transmitting apparatus according to claim 1, wherein the transmitting apparatus further comprises LDPC encoding means for encoding by an LDPC code to the transmission data.

4. The transmitting apparatus according to claim 1, wherein the system is a data transmission system for time-division multiplexing and for transmitting with plural kinds of digital modulation schemes.

5. The transmitting apparatus according to claim 4, wherein one or more of 32APSK, 16APSK, 32QAM, and 16QAM is included as the digital modulation scheme.

6. A transmitting apparatus used for a system that transmits data according to a digital modulation scheme for shifting amplitude and phase, the transmitting apparatus comprising:
   means for mapping, for each number of bits per symbol corresponding to respective signal points of the modulation scheme, transmission data to the signal points;
   means for applying, in predefined order, signal point mapping to at least one of signal points on respective concentric circles of symbols allocated to the respective signal points of the modulation scheme;
   means for periodically time-division multiplexing a signal point signal generated by mapping the symbols in the predefined order on a signal point signal generated by mapping the transmission data to generate a time division multiplex signal; and
   means for applying orthogonal modulation to the generated time division multiplex signal and transmitting orthogonal modulated carrier signal,
   wherein the transmitting apparatus periodically time-division multiplexes the signal in predefined order, orthogonally modulates the signal, and transmits the signal with symbols allocated to the respective signal points of the digital modulation scheme set as pilot signals.

7. The transmitting apparatus according to claim 6, wherein the digital modulation scheme for shifting amplitude and phase is 16APSK, 16QAM, 32APSK, or 32QAM.

8. The transmitting apparatus according to claim 6, wherein the transmitting apparatus further comprises LDPC encoding means for encoding by an LDPC code to the transmission data.

9. The transmitting apparatus according to claim 6, wherein the system is a data transmission system for time-division multiplexing and for transmitting with plural kinds of digital modulation schemes.

10. The transmitting apparatus according to claim 9, wherein one or more of 32APSK, 16APSK, 32QAM, and 16QAM is included as the digital modulation scheme.

* * * * *